United States Patent
Gin et al.

(10) Patent No.: US 11,745,147 B2
(45) Date of Patent: Sep. 5, 2023

(54) CURABLE POLY(RTIL)-BASED MIXED-MATRIX MEMBRANES AND METHODS USING SAME

(71) Applicant: THE REGENTS OF THE UNIVERSITY OF COLORADO, A BODY CORPORATE, Denver, CO (US)

(72) Inventors: Douglas L. Gin, Longmont, CO (US); Collin Andrew Dunn, Boulder, CO (US); Zoban Singh, Portland, OR (US); Richard D. Noble, Boulder, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 261 days.

(21) Appl. No.: 17/058,821

(22) PCT Filed: May 29, 2019

(86) PCT No.: PCT/US2019/034428
§ 371 (c)(1),
(2) Date: Nov. 25, 2020

(87) PCT Pub. No.: WO2019/232074
PCT Pub. Date: Dec. 5, 2019

(65) Prior Publication Data
US 2021/0205762 A1 Jul. 8, 2021

Related U.S. Application Data

(60) Provisional application No. 62/677,223, filed on May 29, 2018.

(51) Int. Cl.
*B01D 69/14* (2006.01)
*B01D 53/22* (2006.01)
(Continued)

(52) U.S. Cl.
CPC ......... *B01D 69/148* (2013.01); *B01D 53/228* (2013.01); *B01D 69/125* (2013.01);
(Continued)

(58) Field of Classification Search
None
See application file for complete search history.

(56) References Cited

U.S. PATENT DOCUMENTS

| 2012/0160095 A1 | 6/2012 | Gin et al. |
| 2015/0209776 A1* | 7/2015 | Gin .................... B01D 53/228 96/13 |

(Continued)

FOREIGN PATENT DOCUMENTS

| WO | 2014011661 A2 | 1/2014 |
| WO | 2017075242 A1 | 5/2017 |

OTHER PUBLICATIONS

Singh, Zoban V. et al., "Determination and optimization of factors affecting CO2/CH4 separation performance in poly(ionic liquid)-ionic liquid-zeolite mixed-matrix membranes", Journal of Membrane Science, 509, 2016, pp. 149-155. (Year: 2016).*

(Continued)

*Primary Examiner* — Jason M Greene
(74) *Attorney, Agent, or Firm* — Saul Ewing LLP; Kathryn Doyle; Domingos J. Silva

(57) ABSTRACT

The invention includes compositions and methods for promoting gas mixtures separations, such as a carbon dioxide and methane mixture. The composition of the invention is based on a curable polymerized room-temperature ionic liquid [poly(RTIL)].

24 Claims, 15 Drawing Sheets

(51) Int. Cl.
  *B01D 69/12*  (2006.01)
  *B01D 71/02*  (2006.01)
  *B01D 71/76*  (2006.01)
  *C10L 3/10*   (2006.01)

(52) U.S. Cl.
  CPC ........... *B01D 71/028* (2013.01); *B01D 71/76* (2013.01); *C10L 3/104* (2013.01); *B01D 2256/245* (2013.01); *B01D 2257/504* (2013.01); *B01D 2323/30* (2013.01); *C10L 2290/548* (2013.01)

(56) References Cited

U.S. PATENT DOCUMENTS

2017/0298026 A1  10/2017  Tsanaktsidis et al.
2018/0298728 A1  10/2018  Saraya

OTHER PUBLICATIONS

Chong, Yen K. et al., "Thiocarbonylthio End Group Removal from RAFT-Synthesized Polymers by Radical-Induced Reaction", Macromolecules, 40, 2007, pp. 4446-4455. (Year: 2007).*

Carlisle, Trevor K. et al., "Vinyl-Functionalized Poly(imidazolium)s: A Curable Polymer Platform for Cross-Linked Ionic Liquid Gel Synthesis", Chemistry of Materials, 26, 2014, pp. 1294-1296. (Year: 2014).*

Hudiono, Yeny C. et al., "Novel mixed matrix membranes based on polymerizable room-temperature ionic liquids and SAPO-34 particles to improve CO2 separation", Journal of Membrane Science, 370, 2011, pp. 141-148. (Year: 2011).*

Hao, Lin et al., "Room temperature ionic liquid/ZIF-* mixed matrix membranes for natural gas sweetening and post combustion CO2 capture", Journal of Membrane Science, 436, 2013, pp. 221-231. (Year: 2013).*

International Search Report and Written Opinion dated Aug. 19, 2019 for International Application No. PCT/US19/34428.

Bara, et al., "Gas separations in fluoroalkyl-functionalized room-temperature ionic liquids using supported liquid membranes", Chemical Engineering Journal, 147, 2009, 43-50.

Bara, et al., "Improving CO2 permeability in polymerized roomtemperature ionic liquid gas separation membranes through the formation of a solid composite with a room-temperature ionic liquid", Polymers for Advanced Technologies, 19, 2008, 1415-1420.

Bara, et al., "Synthesis and Performance of Polymerizable Room-Temperature Ionic Liquids as Gas Separation Membranes", Industrial & Engineering Chemistry Research, 46, 2007, 5398-5404.

Carlisle, et al., "Ideal CO2/Light Gas Separation Performance of Poly(vinylimidazolium) Membranes and Poly(vinylimidazolium)-Ionic Liquid Composite Films", Industrial & Engineering Chemistry Research, 52, 2013, 1023-1032.

Carlisle, et al., "Vinyl-Functionalized Poly(imidazolium)s: A Curable Polymer Platform for Cross-Linked Ionic Liquid Gel Synthesis", Chem Mater, vol. 26, 2014, pp. 1294-1296.

Chong, et al., "Thiocarbonylthio End Group Removal from RAFT-Synthesized Polymers by Radical-Induced Reduction", Macromolecules, vol. 40, 2007, pp. 4446-4455.

Huang, et al., "Recent advances in alternating copolymers: The synthesis, modification, and applications of precision polymers", Polymer, vol. 116, 2017, pp. 572-586.

Ilconich, et al., "Experimental investigation of the permeability and selectivity of supported ionic liquid membranes for CO2/He separation at".

Mori, et al., "RAFT Polymerization of N-Vinylimidazolium Salts and Synthesis of Thermoresponsive Ionic Liquid Block Copolymers", Macromolecules, vol. 42, 2009, pp. 8082-8092.

Singh, et al., "Determination and optimization of factors affecting CO2/CH4 separation performance in a poly(ionic liquid)-ionic liquid-zeolite mixed-matrix membranes", Journal of Membrane Science, vol. 509, 2016, pp. 149-155.

* cited by examiner

CURABLE POLY(RTIL)-BASED MIXED-MATRIX MEMBRANES AND METHODS USING SAME

The present application is a 35 U.S.C. § 371 national phase application of, and claims priority to, International Application No. PCT/US2019/034428, filed May 29, 2019, which claims priority under 35 U.S.C. § 119(e) to U.S. Provisional Patent Application No. 62/677,223, filed May 29, 2018, all of which applications are incorporated herein by reference in their entireties.

BACKGROUND OF THE INVENTION

The global demand for natural gas is growing, as is the demand for technologies that can improve extracted gas to pipeline grade. In 2015, the U.S. alone consumed over 24 million standard cubic feet of natural gas, and global natural gas production that year increased by 2.2% from 2014. Natural gas is primarily composed of methane ($CH_4$), but can contain heavier hydrocarbons, as well as water ($H_2O$), carbon dioxide ($CO_2$), hydrogen sulfide ($H_2S$), helium (He), and nitrogen ($N_2$). $CO_2$ is detrimental to gas quality, as it depresses the heating value of natural gas, and forms carbonic acid in the presence of water, which corrodes pipeline equipment. Common methods for removing $CO_2$ include cryogenic distillation, pressure or temperature swing adsorption, amine scrubbing, and membrane separation. Currently, amine scrubbing is the dominant technology, while membranes account for only 5% of the separations market. However, scrubbing requires a significant energy cost to strip $CO_2$ from the amine salt, and poses an environmental risk. Membrane systems costs are primarily due to high-pressure vessels and fittings. If $CO_2$ permeability can be increased without sacrificing selectivity, fewer membrane modules can be used to process the same volume of gas. This has led to a drive within the industry develop new membrane materials with a desirable combination of permeability and gas pair selectivity.

Polymer membrane performance is limited by an inherent trade-off between permeability and selectivity, due to the nature of gas diffusion through a polymer matrix. This is often represented by the 'Robeson upper bound' limits for gas pair separations defined by the performances of 'best case' polymer materials. However, membranes made from non-polymeric materials are not subject to this limit. Ceramic membranes made from zeolites can achieve some of the highest performances seen in literature but are difficult and expensive to manufacture compared to the polymer-based membranes.

There is thus a need for novel materials and methods that can be used to separate gas mixtures. In certain embodiments, these materials should combine the performance of a ceramic membrane with the relative ease of manufacture of a polymeric membrane. The present invention addresses this need.

BRIEF SUMMARY OF THE INVENTION

In one aspect, the invention provides a composition comprising at least one porous solid; a non-polymerizable room-temperature ionic liquid [RTIL]; and a polymer based on an RTIL [poly(RTIL)] comprising a backbone and a plurality of side chains attached to the backbone, wherein the plurality of side chains comprises independently selected RTILs, wherein at least one RTIL in the plurality of side chains is functionalized with a self-cross-linking group. In certain embodiments, each RTIL is independently a compound of Formula (I):

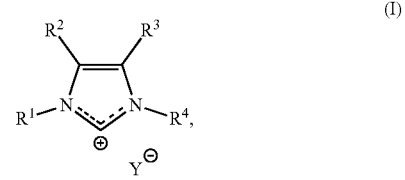

wherein each occurrence of $R^{1-4}$ and Y are independently as defined elsewhere herein. In certain embodiments, at least a fraction of the self-cross-linking groups are cross-linked (polymerized).

In another aspect, the invention provides a mixed-matrix membrane (MMM) formed from the composition of the invention.

In yet another aspect, the invention provides a method of selectively separating a first gas component from a gas mixture containing at least a first component and a second gas component. In certain embodiments, the method comprises contacting the gas mixture with a surface of the MMM of the invention, wherein the first gas component selectively diffuses to the opposite surface of the MMM as compared to second gas component, thus selectively removing the first gas component over the second gas component from the gas mixture.

BRIEF DESCRIPTION OF THE DRAWINGS

The following detailed description of illustrative embodiments of the invention will be better understood when read in conjunction with the appended drawings. For the purpose of illustrating the invention, certain illustrative embodiments are shown in the drawings. It should be understood, however, that the invention is not limited to the precise arrangements and instrumentalities of the embodiments shown in the drawings.

FIG. 12 shows a surface SEM image of a (64-16-20) MMM based on curable RTIL prepolymer 1a.

FIG. 13 shows a cross-section SEM image of a (64-16-20) MMM based on curable RTIL prepolymer 1a.

DETAILED DESCRIPTION OF THE INVENTION

Figure 1:
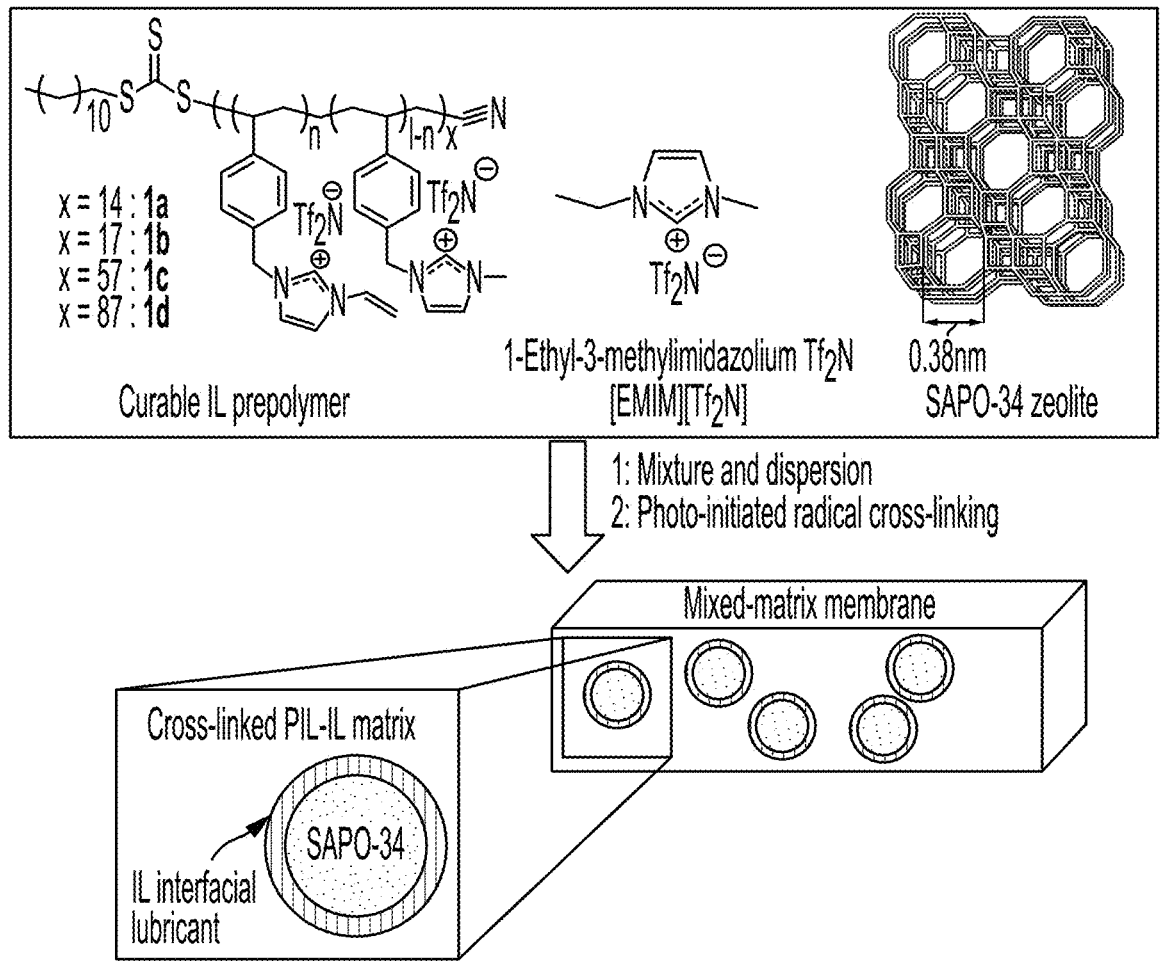
FIG. 1 is a schematic showing components of the curable RTIL prepolymer-based (Cross-Linked [poly(RTIL)]-RTIL-Zeolite) mixed-matrix membrane (MMM) Platform.

The present invention provides in one aspect compositions comprising a free (non-polymerizable) room-temperature ionic liquid [RTIL], a polymerized room-temperature ionic liquid [poly(RTIL)] with self-cross-linking functionalities, and porous solids, such as, in non-limiting examples, zeolites, nanoporous solids, and molecular sieves. In certain embodiments, at least a fraction of the self-cross-linking functionalities is further cross-linked in the compositions. In other embodiments, the compositions of the invention can be used to purify natural gas streams by removing $CO_2$ from those streams via a membrane-based separation.

Mixed-matrix membranes (MMMs) are membranes composed of a dispersed phase combined with a polymer matrix. MMMs maintain the superior separatory efficiency of the dispersed phase, while taking advantage of the relative ease of processing associated with the polymer matrix. The dispersant phase can be a porous, highly selective material that would otherwise be too difficult to efficiently manufacture into a membrane (e.g., zeolites, metal-organic frameworks, or supramolecular organic frameworks). A key disadvantage of these microporous materials is that improper adhesion at the dispersant/matrix interface degrades membrane performance. Interfacial voids, chain rigidification, and pore plugging can all contribute to reduced MMM performance.

MMMs made using poly(room-temperature ionic liquid) (i.e., poly(RTIL)), zeolite, and free room-temperature ionic liquid (i.e., RTIL) components have been reported in the literature, but such membranes were made by cross-linking RTIL monomers in situ as a means of forming the desired poly(RTIL) network around the RTIL and zeolite component. There are a number of drawbacks associated with this small-molecule RTIL monomer polymerization approach. For example, the viscosity of a solution of RTIL monomer is lower than that of solution of a comparable poly(RTIL) due to the lack of polymer chain entanglements/interactions. During typical thin-film composite (TFC) membrane casting, significant penetration of the monomer solution into the porous support occurs, resulting in selective layer soak-in with formation of defects and loss of thickness control. The polymerization of low molecular-weight (MW) monomers also requires relatively long set times. Further, cross-linking the RTIL monomers typically requires the use of volatile organic cross-linking agents such as divinylbenzene (DVB).

As shown herein, the present disclosure provides the use of a curable (i.e., intrinsically cross-linkable) RTIL prepolymer to prepare (cross-linked poly(RTIL)-RTIL-zeolite) MMMs. Curable prepolymers are polymers or oligomers that contain unpolymerized cross-linking groups, which are capable of forming chemical cross-links with other cross-linking groups in the same curable prepolymer or a different curable prepolymer. In certain embodiments, these curable prepolymer do not require an additional cross-linking agent for the polymerization (curing process) to be achieved.

Fully polymerized polymers do not penetrate into the pores of membrane supports (even when dissolved), whereas solutions of monomer-RTIL often do penetrate into the pores of such membrane supports. In certain embodiments, a polymer- or prepolymer/oligomer-based casting solution leads to higher viscosity casting solutions than the corresponding monomer solution. In yet other embodiments, the MMMs of the invention have improved resistance to support penetration when casting on UF than those prepared from monomeric polymerizable small molecule RTIL. In certain embodiments, the MMMs of the invention have faster gelation (i.e., set) times than those prepared from monomeric polymerizable small molecule RTIL. In certain embodiments, the MMMs of the invention have susceptibility to additive volatility. In certain embodiments, the MMMs of the invention allow for $CO_2/CH_4$ separation. Additionally, by varying the chain length of the curable RTIL prepolymer used, it is possible to vary the casting solution penetration susceptibility, the gelation time, and the $CO_2/CH_4$ separation performance of the final MMM.

By modifying the chain length of the curable RTIL prepolymer (1a-1d) used in the preparation of these MMMs, it was possible to vary the curing time and support penetration resistance of the initial casting mixture, as well as the $CO_2/CH_4$ separation capabilities of the final MMMs. This modification was done by varying the chain length of the oligomeric poly(chloromethylstyrene) precursors (2a-2d) that were prepared by reversible addition-fragmentation chain-transfer (RAFT) polymerization.

To explore the possibility of synthesizing MMMs based on curable RTIL prepolymer starting materials, initial baseline performance trials centered on the uncontrolled polymerization of 4-chloromethylstyrene as a precursor for a curable poly(RTIL) previously reported (Carlisle, et al., 2014, Chem. Mater. 26:1294-1296). Once cured, this polymer displays a structure almost identical to cross-linked poly([1-styryl-3-methylimidazolium][$Tf_2N$]), a component in some of the most high-performing MMMs reported in literature. Surprisingly, it was found that MMMs based on long-chain curable poly(RTIL)s prepared by conventional, uncontrolled free radical polymerization were too brittle to evaluate for gas separation performance. Thus, controlled polymerization was employed to circumvent this problem. RAFT polymerization was chosen as the controlled polymerization method for producing curable RTIL prepolymers with controlled, stoichiometry-based, low degrees of polymerization and polydispersity, since other controlled or living chain-addition polymerization methods were unsuitable for the 4-chloromethylstyrene monomer.

Cyanomethyldodecyl trithiocarbonate was chosen as the RAFT agent because it was both suitable for styrene-based monomers and available as a solid. That said, any RAFT agent can be used within the compositions and methods of the invention. Non-limiting examples of RAFT agents include any trithiocarbamates, dithiocarbamates, trithiocarbonates, xanthates (dithiocarbonates), dithioates, and analogues thereof, such as but not limited to, 3,5-Bis(2-dodecylthiocarbonothioylthio-1-oxopropoxy)benzoic acid, 3-Butenyl 2-(dodecylthiocarbonothioylthio)-2-methylpropionate, 2-(2-Carboxyethylsulfanylthiocarbonylsulfanyl)propionic acid, 4-((((2-Carboxyethyl)thio) carbonothioyl)thio)-4-cyanopentanoic acid, 2-Cyanobutan-2-yl 4-chloro-3,5- dimethyl-1H-pyrazole-1-carbodithioate, 2-Cyanobutanyl-2-yl 3,5-dimethyl-1H-pyrazole-1-carbodithioate, 4-Cyano-4-[(dodecylsulfanylthiocarbonyl)sulfanyl]pentanoic acid, 4-Cyano-4-[(dodecylsulfanylthiocarbonyl)sulfanyl]pentanol, Cyanomethyl (3,5-Dimethyl-1H-pyrazole)-carbodithioate, Cyanomethyl dodecyl trithiocarbonate, Cyanomethyl [3-(trimethoxysilyl)propyl]trithiocarbonate, 2-Cyano-2-propyl dodecyl trithiocarbonate, S,S-Dibenzyl trithiocarbonate, 2-(Dodecylthiocarbonothioylthio)-2-methylpropionic acid, 2-(Dodecylthiocarbonothioylthio)-2-methylpropionic acid 3-azido-1-propanol ester, 2-(Dodecylthiocarbonothioylthio)-2-methylpropionic acid N-hydroxysuccinimide ester, 2-(Dodecylthiocarbonothioylthio)-2-methylpropionic acid pentafluorophenyl ester, 2-(Dodecylthiocarbonothioylthio) propionic acid, Methyl 2-(dodecylthiocarbonothioylthio)-2-methylpropionate, Pentaerythritol tetrakis[2-(dodecylthiocarbonothioylthio)-2-methylpropionate],
Phthalimidomethyl butyl trithiocarbonate, and the like.

Curable RTIL prepolymer total degree of polymerization (x) target values of 10, 20, 40, and 80 were chosen in a non-limiting aspect, as they covered a range of MWs, with larger chains "diluting" the chemical and/or physical effects of their RAFT agent end groups. The actual degree of polymerization values for the synthesized curable RTIL prepolymers were experimentally determined to be x=14, 17, 57, and 87, as shown in FIG. 1. A 25 mol % target loading of vinyl-containing side groups allows for the shortest prepolymers to crosslink, without approaching crosslinking densities that would result in extensive chain rigidification around the zeolite particles. 1-Ethyl-3-methylimidazolium bistriflamide ([EMIM][Tf$_2$N]) was selected as the added RTIL that would act as an ionic interfacial lubricant due to its compatibility with similar RTIL monomers, poly(RTIL)s, and charged zeolite components. That said, any RTIL can be used within the compositions and methods of the invention. SAPO-34 was chosen as the zeolite particle additive because it has an affinity for separating $CO_2$ from $CH_4$ due to a combination of size sieving and thermodynamic favorability. In certain embodiments, the prepolymers of the invention include the following:

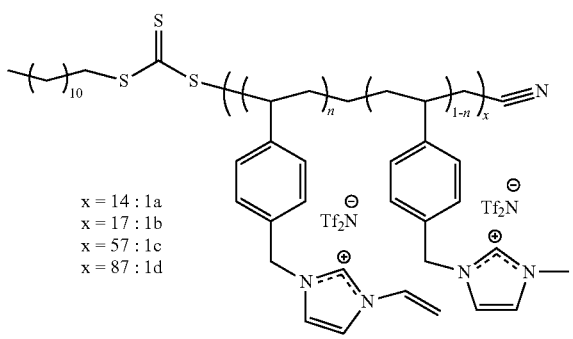

x = 14 : 1a
x = 17 : 1b
x = 57 : 1c
x = 87 : 1d

Further characterization of the compositions and MMMs of the invention is described elsewhere herein.

Definitions

As used herein, each of the following terms has the meaning associated with it in this section.

As used herein, unless defined otherwise, all technical and scientific terms generally have the same meaning as commonly understood by one of ordinary skill in the art to which this invention belongs. Generally, the nomenclature used herein and the laboratory procedures in inorganic and/or organic chemistry, polymer chemistry and materials sciences are those well-known and commonly employed in the art.

Abbreviations used herein include: RTIL=room-temperature ionic liquid; poly(RTIL)=poly(room-temperature ionic liquid); MMM=mixed-matrix membrane; TFC=thin-film composite; RAFT=reversible addition-fragmentation chain transfer; VMIM=1-vinyl-3-methylimidazolium.

As used herein, the articles "a" and "an" refer to one or to more than one (i.e. to at least one) of the grammatical object of the article. By way of example, "an element" means one element or more than one element.

As used herein, the term "about" will be understood by persons of ordinary skill in the art and will vary to some extent on the context in which it is used. As used herein, "about" when referring to a measurable value such as an amount, a temporal duration, and the like, is meant to encompass variations of ±20% or ±10%, more preferably ±5%, even more preferably ±1%, and still more preferably ±0.1% from the specified value, as such variations are appropriate to perform the disclosed methods.

As used herein, the term "comprising" includes "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements.

As used herein, the term "cross-linker" refers to a molecule that can form a chemical link between 2 polymers or oligomers. These links can be in the form of covalent bonds or ionic bonds.

As used herein, the terms "functionalized", "covalently bound" or "covalently conjugated" refers to the formation of a covalent bond between two chemical species or moieties. Covalent bonds are to be taken to have the meaning commonly accepted in the art, referring to a chemical bond that involves the sharing of electron pairs between atoms.

As used herein, the term "instructional material" includes a publication, a recording, a diagram, or any other medium of expression that may be used to communicate the usefulness of the compositions of the invention. In certain embodiments, the instructional material may be part of a kit useful for generating a system of the invention. The instructional material of the kit may, for example, be affixed to a container that contains the compositions of the invention or be shipped together with a container that contains the compositions. Alternatively, the instructional material may be shipped separately from the container with the intention that the recipient uses the instructional material and the compositions cooperatively. For example, the instructional material is for use of a kit; instructions for use of the compositions; or instructions for use of a formulation of the compositions.

As used herein, the term "room temperature ionic liquid (RTIL)" or "ionic liquid (IL)" refers to a salt in the liquid state having melting point below about 100° C. (212° F.).

As used herein, a "membrane" is a barrier that separates two fluids and allows for transport between the fluids. In certain embodiments, the porous membrane is a nanoporous membrane.

As used herein, the term "nanoporous" refers to a pore size between about 0.5 and about 6 nm in diameter, and a "nanofiltration membrane" has an effective pore size between about 0.5 and about 6 nm.

As used herein, the term "polymer" refers to a molecule composed of repeating structural units typically connected by covalent chemical bonds. The term "polymer" is also meant to include the terms copolymer and oligomers.

As used herein, the term "polymerization" refers to at least one reaction that consumes at least one functional group in a monomeric molecule (or monomer), oligomeric molecule (or oligomer) or polymeric molecule (or polymer), to create at least one chemical linkage between at least two distinct molecules (e.g., intermolecular bond), at least one chemical linkage within the same molecule (e.g., intramolecular bond), or any combination thereof. A polymerization reaction may consume between about 0% and about 100% of the at least one functional group available in the system. In certain embodiments, polymerization of at least one functional group results in about 100% consumption of the at least one functional group. In other embodiments, polymerization of at least one functional group results in less than about 100% consumption of the at least one functional group.

As used herein, the term "self-cross-linking group" refers to a functional group that is present within a polymer and is capable of forming a chemical link with another self-cross-linking group in another polymer or another self-cross-linking group in the same polymer, without the need of any separate/external cross-linker or catalyst.

As used herein, the term "alkyl", by itself or as part of another substituent means, unless otherwise stated, a straight or branched chain hydrocarbon having the number of carbon atoms designated (i.e., $C_1$-$C_{15}$ means one to fifteen carbon atoms) and includes straight, branched chain, or cyclic substituent groups. Examples include methyl, ethyl, propyl, isopropyl, butyl, isobutyl, tert-butyl, pentyl, neopentyl, hexyl, cyclopropylmethyl, and dodecanyl. Most preferred is ($C_1$-$C_6$)alkyl, such as, but not limited to, ethyl, methyl, isopropyl, isobutyl, n-pentyl, n-hexyl and cyclopropylmethyl.

As used herein, the term "cycloalkyl", by itself or as part of another substituent means, unless otherwise stated, a cyclic chain hydrocarbon having the number of carbon atoms designated (i.e., $C_3$-$C_6$ means a cyclic group comprising a ring group consisting of three to six carbon atoms) and includes straight, branched chain or cyclic substituent groups. Examples include cyclopropyl, cyclobutyl, cyclopentyl, cyclohexyl, cycloheptyl, and cyclooctyl. Most preferred is ($C_3$-$C_6$)cycloalkyl, such as, but not limited to, cyclopropyl, cyclobutyl, cyclopentyl and cyclohexyl. Examples of polycyclic cycloalkyls include betulin and betulinic acid.

As used herein, the term "alkenyl", employed alone or in combination with other terms, means, unless otherwise stated, a stable mono-unsaturated, di-unsaturated, or tri-unsaturated straight chain or branched chain hydrocarbon group having the stated number of carbon atoms. Examples include vinyl, propenyl (or allyl), crotyl, isopentenyl, butadienyl, 1,3-pentadienyl, 1,4-pentadienyl, and the higher homologs and isomers. A functional group representing an alkene is exemplified by —$CH_2$—CH=$CH_2$.

As used herein, the term "alkynyl", employed alone or in combination with other terms, means, unless otherwise stated, a stable straight chain or branched chain hydrocarbon group with a triple carbon-carbon bond, having the stated number of carbon atoms. Non-limiting examples include ethynyl and propynyl, and the higher homologs and isomers.

As used herein, the term "alkylene" by itself or as part of another substituent means, unless otherwise stated, a straight or branched hydrocarbon group having the number of carbon atoms designated (i.e., $C_1$-$C_{15}$ means one to fifteen carbon atoms) and includes straight, branched chain, or cyclic substituent groups, wherein the group has two open valencies. Examples include methylene, 1,2-ethylene, 1,1-ethylene, 1,1-propylene, 1,2-propylene and 1,3-propylene. Heteroalkylene substituents can a group consisting of the stated number of carbon atoms and one or more heteroatoms selected from the group consisting of O, N, and S, and wherein the nitrogen and sulfur atoms may be optionally oxidized and the nitrogen heteroatom may be optionally quaternized. The heteroatom(s) may be placed at any position of the heteroalkyl group, including between the rest of the heteroalkyl group and the fragment to which it is attached, as well as attached to the most distal carbon atom in the heteroalkyl group.

As used herein, the term "alkenylene", employed alone or in combination with other terms, means, unless otherwise stated, a stable mono-unsaturated or di-unsaturated straight chain or branched chain hydrocarbon group having the stated number of carbon atoms wherein the group has two open valencies.

As used herein, the term "alkynylene", employed alone or in combination with other terms, means, unless otherwise stated, a stable straight chain or branched chain hydrocarbon group with a triple carbon-carbon bond, having the stated number of carbon atoms wherein the group has two open valencies.

As used herein, the term "substituted alkyl", "substituted cycloalkyl", "substituted alkenyl", "substituted alkynyl", "substituted alkylene", "substituted alkenylene" or "substituted alkynylene" means alkyl, cycloalkyl, alkenyl, alkynyl, alkylene, alkenylene, alkynylene as defined above, substituted by one, two or three substituents selected from the group consisting of $C_1$-$C_{10}$ alkyl, halogen, =O, —OH, alkoxy, tetrahydro-2-H-pyranyl, —$NH_2$, —$N(CH_3)_2$, (1-methyl-imidazol-2-yl), pyridin-2-yl, pyridin-3-yl, pyridin-4-yl, —C(=O)OH, trifluoromethyl, —C≡N, —C(=O)O($C_1$-$C_4$)alkyl, —C(=O)$NH_2$, —C(=O)NH($C_1$-$C_4$)alkyl, —C(=O)N(($C_1$-$C_4$)alkyl)$_2$, —$SO_2NH_2$, —C(=NH)$NH_2$, and —$NO_2$, preferably containing one or two substituents selected from halogen, —OH, alkoxy, —$NH_2$, trifluoromethyl, —$N(CH_3)_2$, and —C(=O)OH, more preferably selected from halogen, alkoxy and —OH. Examples of substituted alkyls include, but are not limited to, 2,2-difluoropropyl, 2-carboxycyclopentyl and 3-chloropropyl.

As used herein, the term "alkoxy" employed alone or in combination with other terms means, unless otherwise stated, an alkyl group having the designated number of carbon atoms, as defined above, connected to the rest of the molecule via an oxygen atom, such as, for example, methoxy, ethoxy, 1-propoxy, 2-propoxy (isopropoxy) and the higher homologs and isomers. Preferred are ($C_1$-$C_3$) alkoxy, such as, but not limited to, ethoxy and methoxy.

As used herein, the term "halo" or "halogen" alone or as part of another substituent means, unless otherwise stated, a fluorine, chlorine, bromine, or iodine atom, preferably, fluorine, chlorine, or bromine, more preferably, fluorine or chlorine.

As used herein, the term "heteroalkyl" by itself or in combination with another term means, unless otherwise stated, a stable straight or branched chain alkyl group consisting of the stated number of carbon atoms and one or two heteroatoms selected from the group consisting of O, N, and S, and wherein the nitrogen and sulfur atoms may be optionally oxidized and the nitrogen heteroatom may be optionally quaternized. The heteroatom(s) may be placed at any position of the heteroalkyl group, including between the rest of the heteroalkyl group and the fragment to which it is attached, as well as attached to the most distal carbon atom in the heteroalkyl group. Examples include: —$CH_2$—$CH_2$—$CH_3$, —$CH_2$—$CH_2$—$CH_2$—OH, —$CH_2$—$CH_2$—NH—$CH_3$, —$CH_2$—S—$CH_2$—$CH_3$, and —$CH_2CH_2$—S(=O)—$CH_3$. Up to two heteroatoms may be consecutive, such as, for example, —$CH_2$—NH—$OCH_3$, or —$CH_2$—$CH_2$—S—S—$CH_3$.

As used herein, the term "aryl", employed alone or in combination with other terms, means, unless otherwise stated, a carbocyclic aromatic system containing one or more rings (typically one, two or three rings) wherein such rings may be attached together in a pendent manner, such as a biphenyl, or may be fused, such as naphthalene. Examples include phenyl, anthracyl, and naphthyl. Preferred are phenyl and naphthyl, most preferred is phenyl.

As used herein, the term "heteroaryl" or "heteroaromatic" refers to a heterocycle having aromatic character. A polycyclic heteroaryl may include one or more rings that are partially saturated. Examples include tetrahydroquinoline and 2,3-dihydrobenzofuryl.

Examples of non-aromatic heterocycles include monocyclic groups such as aziridine, oxirane, thiirane, azetidine, oxetane, thietane, pyrrolidine, pyrroline, imidazoline, pyrazolidine, dioxolane, sulfolane, 2,3-dihydrofuran, 2,5-dihydrofuran, tetrahydrofuran, thiophane, piperidine, 1,2,3,6-tetrahydropyridine, 1,4-dihydropyridine, piperazine, morpholine, thiomorpholine, pyran, 2,3-dihydropyran, tetrahydropyran, 1,4-dioxane, 1,3-dioxane, homopiperazine, homopiperidine, 1,3-dioxepane, 4,7-dihydro-1,3-dioxepin and hexamethyleneoxide.

Examples of heteroaryl groups include pyridyl, pyrazinyl, pyrimidinyl (such as, but not limited to, 2- and 4-pyrimidinyl), pyridazinyl, thienyl, furyl, pyrrolyl, imidazolyl, thiazolyl, oxazolyl, pyrazolyl, isothiazolyl, 1,2,3-triazolyl, 1,2,4-triazolyl, 1,3,4-triazolyl, tetrazolyl, 1,2,3-thiadiazolyl, 1,2,3-oxadiazolyl, 1,3,4-thiadiazolyl and 1,3,4-oxadiazolyl.

Examples of polycyclic heterocycles include isosorbide, isomannide, isoidide, lupeol, indolyl (such as, but not limited to, 3-, 4-, 5-, 6- and 7-indolyl), indolinyl, quinolyl, tetrahydroquinolyl, isoquinolyl (such as, but not limited to, 1- and 5-isoquinolyl), 1,2,3,4-tetrahydroisoquinolyl, cinnolinyl, quinoxalinyl (such as, but not limited to, 2- and 5-quinoxalinyl), quinazolinyl, phthalazinyl, 1,8-naphthyridinyl, 1,4-benzodioxanyl, coumarin, dihydrocoumarin, 1,5-naphthyridinyl, benzofuryl (such as, but not limited to, 3-, 4-, 5-, 6- and 7-benzofuryl), 2,3-dihydrobenzofuryl, 1,2-benzisoxazolyl, benzothienyl (such as, but not limited to, 3-, 4-, 5-, 6-, and 7-benzothienyl), benzoxazolyl, benzothiazolyl (such as, but not limited to, 2-benzothiazolyl and 5-benzothiazolyl), purinyl, benzimidazolyl, benztriazolyl, thioxanthinyl, carbazolyl, carbolinyl, acridinyl, pyrrolizidinyl, and quinolizidinyl.

The aforementioned listing of heterocyclyl and heteroaryl moieties is intended to be representative and not limiting.

As used herein, the term "substituted" means that an atom or group of atoms has replaced hydrogen as the substituent attached to another group.

For aryl, aryl-($C_1$-$C_3$)alkyl and heterocyclyl groups, the term "substituted" as applied to the rings of these groups refers to any level of substitution, namely mono-, di-, tri-, tetra-, or penta-substitution, where such substitution is permitted. The substituents are independently selected, and substitution may be at any chemically accessible position. In one embodiment, the substituents vary in number between one and four. In another embodiment, the substituents vary in number between one and three. In yet another embodiment, the substituents vary in number between one and two. In yet another embodiment, the substituents are independently selected from the group consisting of $C_{1-6}$ alkyl, —OH, $C_{1-6}$ alkoxy, halo, amino, acetamido and nitro. As used herein, where a substituent is an alkyl or alkoxy group, the carbon chain may be branched, straight or cyclic, with straight being preferred.

Throughout this disclosure, various aspects of the invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range and, when appropriate, partial integers of the numerical values within ranges. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Compositions

In one aspect, the invention provides a composition comprising: at least one porous solid; a non-polymerizable room-temperature ionic liquid [RTIL]; a polymer [poly (RTIL)] comprising a backbone and a plurality of side chains attached to the backbone, wherein the plurality of side chains comprises independently selected RTILs, wherein at least one RTIL in the plurality of side chains is functionalized with a self-cross-linking group; wherein each RTIL is independently a compound of Formula (I):

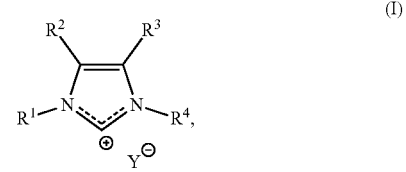

wherein: each occurrence of $R^1$ and $R^4$ is independently selected from the group consisting of optionally substituted $C_1$-$C_6$ alkyl, optionally substituted $C_2$-$C_6$ alkenyl, optionally $C_2$-$C_6$ alkynyl, optionally $C_1$-$C_6$ alkoxy, optionally $C_1$-$C_6$ aminoalkyl, optionally $C_1$-$C_6$ haloalkoxy, optionally $C_1$-$C_6$ haloalkyl, optionally substituted aryl, and optionally substituted heteroaryl; each occurrence of $R^2$ and $R^3$ is independently selected from the group consisting of H, optionally substituted $C_1$-$C_6$ alkyl, optionally substituted $C_2$-$C_6$ alkenyl, optionally $C_2$-$C_6$ alkynyl, optionally $C_1$-$C_6$ alkoxy, optionally $C_1$-$C_6$ aminoalkyl, optionally $C_1$-$C_6$ haloalkoxy, and optionally $C_1$-$C_6$ haloalkyl, Y is an anion selected from the group consisting of $Tf_2N^-$, $BF_4^-$, $N(CN)_2^-$, $PF_6^-$, $C(CN)_3^-$, $B(CN)_4^-$, $N(SO_2F)_2^-$, $TfO^-$, $SbF_6^-$, halide, and sulfonate.

In certain embodiments, the at least one porous solid is selected from a nanoporous solid, zeolite, and molecular sieve.

In certain embodiments, the at least one porous solid has a pore diameter equal to or lower than about 500 nm. In certain embodiments, the at least one porous solid has a pore diameter equal to or lower than about 400 nm. In certain embodiments, the at least one porous solid has a pore diameter equal to or lower than about 300 nm. In certain embodiments, the at least one porous solid has a pore diameter equal to or lower than about 200 nm. In certain embodiments, the at least one porous solid has a pore diameter equal to or lower than about 150 nm. In certain embodiments, the at least one porous solid has a pore diameter equal to or lower than about 100 nm. In certain embodiments, the at least one porous solid has a pore diameter equal to or lower than about 80 nm. In certain embodiments, the at least one porous solid has a pore diameter equal to or lower than about 60 nm. In certain embodiments, the at least one porous solid has a pore diameter equal to or lower than about 40 nm. In certain embodiments, the at least one porous solid has a pore diameter equal to or lower than about 20 nm. In certain embodiments, the at least one porous solid has a pore diameter equal to or lower than about 18 nm. In certain embodiments, the at least one porous solid has a pore diameter equal to or lower than about 16 nm. In certain embodiments, the at least one porous solid has a pore diameter equal to or lower than about 14 nm. In certain embodiments, the at least one porous solid has a pore diameter equal to or lower than about 12 nm. In certain embodiments, the at least one porous solid has a pore diameter equal to or lower than about 10 nm. In certain embodiments, the at least one porous solid has a pore diameter equal to or lower than about 9.5 nm. In certain embodiments, the at least one porous solid has a pore diameter equal to or lower than about 9 nm. In certain embodiments, the at least one porous solid has a pore diameter equal to or lower than about 8.5 nm. In certain embodiments, the at least one porous solid has a pore diameter equal to or lower than about 8 nm. In certain embodiments, the at least one porous solid has a pore diameter equal to or lower than about 7.5 nm. In certain embodiments, the at least one porous solid has a pore diameter equal to or lower than about 7 nm. In certain embodiments, the at least one porous solid has a pore diameter equal to or lower than about 6.5 nm. In certain embodiments, the at least one porous solid has a pore diameter equal to or lower than about 6 nm. In certain embodiments, the at least one porous solid has a pore diameter equal to or lower than about 5.5 nm. In certain embodiments, the at least one porous solid has a pore diameter equal to or lower than about 5 nm. In certain embodiments, the at least one porous solid has a pore diameter equal to or lower than about 4.5 nm. In certain embodiments, the at least one porous solid has a pore diameter equal to or lower than about 4 nm. In certain embodiments, the at least one porous solid has a pore diameter equal to or lower than about 3.5 nm. In certain embodiments, the at least one porous solid has a pore diameter equal to or lower than about 3 nm. In certain embodiments, the at least one porous solid has a pore diameter equal to or lower than about 2.5 nm. In certain embodiments, the at least one porous solid has a pore diameter equal to or lower than about 2 nm. In certain embodiments, the at least one porous solid has a pore diameter equal to or lower than about 1.9 nm. In certain embodiments, the at least one porous solid has a pore diameter equal to or lower than about 1.8 nm. In certain embodiments, the at least one porous solid has a pore diameter equal to or lower than about 1.7 nm. In certain embodiments, the at least one porous solid has a pore diameter equal to or lower than about 1.6 nm. In certain embodiments, the at least one porous solid has a pore diameter equal to or lower than about 1.5 nm. In certain embodiments, the at least one porous solid has a pore diameter equal to or lower than about 1.4 nm. In certain embodiments, the at least one porous solid has a pore diameter equal to or lower than about 1.3 nm. In certain embodiments, the at least one porous solid has a pore diameter equal to or lower than about 1.2 nm. In certain embodiments, the at least one porous solid has a pore diameter equal to or lower than about 1.1 nm. In certain embodiments, the at least one porous solid has a pore diameter equal to or lower than about 1.0 nm. In certain embodiments, the at least one porous solid has a pore diameter equal to or lower than about 0.95 nm. In certain embodiments, the at least one porous solid has a pore diameter equal to or lower than about 0.9 nm. In certain embodiments, the at least one porous solid has a pore diameter equal to or lower than about 0.85 nm. In certain embodiments, the at least one porous solid has a pore diameter equal to or lower than about 0.8 nm. In certain embodiments, the at least one porous solid has a pore diameter equal to or lower than about 0.75 nm. In certain embodiments, the at least one porous solid has a pore diameter equal to or lower than about 0.7 nm. In certain embodiments, the at least one porous solid has a pore diameter equal to or lower than about 0.65 nm. In certain embodiments, the at least one porous solid has a pore diameter equal to or lower than about 0.6 nm. In certain embodiments, the at least one porous solid has a pore diameter equal to or lower than about 0.55 nm. In certain embodiments, the at least one porous solid has a pore diameter equal to or lower than about 0.5 nm. In certain embodiments, the at least one porous solid has a pore diameter equal to or lower than about 0.48 nm. In certain embodiments, the at least one porous solid has a pore diameter equal to or lower than about 0.46 nm. In certain embodiments, the at least one porous solid has a pore diameter equal to or lower than about 0.45 nm. In certain embodiments, the at least one porous solid has a pore diameter equal to or lower than about 0.44 nm. In certain embodiments, the at least one porous solid has a pore diameter equal to or lower than about 0.42 nm. In certain embodiments, the at least one porous solid has a pore diameter equal to or lower than about 0.4 nm. In certain embodiments, the at least one porous solid has a pore diameter equal to or lower than about 0.38 nm. In certain embodiments, the at least one porous solid has a pore diameter equal to or lower than about 0.36 nm. In certain embodiments, the at least one porous solid has a pore diameter equal to or lower than about 0.35 nm. In certain embodiments, the at least one porous solid has a pore diameter equal to or lower than about 0.34 nm. In certain embodiments, the at least one porous solid has a pore diameter equal to or lower than about 0.32 nm. In certain embodiments, the at least one porous solid has a pore diameter equal to or lower than about 0.3 nm. In certain embodiments, the at least one porous solid has a pore diameter equal to or lower than about 0.28 nm. In certain embodiments, the at least one porous solid has a pore diameter equal to or lower than about 0.26 nm. In certain embodiments, the at least one porous solid has a pore diameter equal to or lower than about 0.25 nm. In certain embodiments, the at least one porous solid has a pore diameter equal to or lower than about 0.24 nm. In certain embodiments, the at least one porous solid has a pore diameter equal to or lower than about 0.22 nm. In certain embodiments, the at least one porous solid has a pore diameter equal to or lower than about 0.2 nm. In certain embodiments, the at least one porous solid has a pore diameter equal to or lower than about 0.175 nm. In certain embodiments, the at least one porous solid has a pore diameter equal to or lower than about 0.15 nm. In certain embodiments, the at least one porous solid has a pore diameter equal to or lower than about 0.125 nm. In certain embodiments, the at least one porous solid has a pore diameter equal to or lower than about 0.1 nm.

In certain embodiments, the at least one porous solid has a pore diameter equal to or greater than about 10 nm. In certain embodiments, the at least one porous solid has a pore diameter equal to or greater than about 9.5 nm. In certain embodiments, the at least one porous solid has a pore diameter equal to or greater than about 9 nm. In certain embodiments, the at least one porous solid has a pore diameter equal to or greater than about 8.5 nm. In certain embodiments, the at least one porous solid has a pore diameter equal to or greater than about 8 nm. In certain embodiments, the at least one porous solid has a pore diameter equal to or greater than about 7.5 nm. In certain embodiments, the at least one porous solid has a pore diameter equal to or greater than about 7 nm. In certain embodiments, the at least one porous solid has a pore diameter equal to or greater than about 6.5 nm. In certain embodiments, the at least one porous solid has a pore diameter equal to or greater than about 6 nm. In certain embodiments, the at least one porous solid has a pore diameter equal to or greater than about 5.5 nm. In certain embodiments, the at least one porous solid has a pore diameter equal to or greater than about 5 nm. In certain embodiments, the at least one porous solid has a pore diameter equal to or greater than about 4.5 nm. In certain embodiments, the at least one porous solid has a pore diameter equal to or greater than about 4 nm. In certain embodiments, the at least one porous solid has a pore diameter equal to or greater than about 3.5 nm. In certain embodiments, the at least one porous solid has a pore diameter equal to or greater than about 3 nm. In certain embodiments, the at least one porous solid has a pore diameter equal to or greater than about 2.5 nm. In certain embodiments, the at least one porous solid has a pore diameter equal to or greater than about 2 nm. In certain embodiments, the at least one porous solid has a pore diameter equal to or greater than about 1.9 nm. In certain embodiments, the at least one porous solid has a pore diameter equal to or greater than about 1.8 nm. In certain embodiments, the at least one porous solid has a pore diameter equal to or greater than about 1.7 nm. In certain embodiments, the at least one porous solid has a pore diameter equal to or greater than about 1.6 nm. In certain embodiments, the at least one porous solid has a pore diameter equal to or greater than about 1.5 nm. In certain embodiments, the at least one porous solid has a pore diameter equal to or greater than about 1.4 nm. In certain embodiments, the at least one porous solid has a pore diameter equal to or greater than about 1.3 nm. In certain embodiments, the at least one porous solid has a pore diameter equal to or greater than about 1.2 nm. In certain embodiments, the at least one porous solid has a pore diameter equal to or greater than about 1.1 nm. In certain embodiments, the at least one porous solid has a pore diameter equal to or greater than about 1.0 nm. In certain embodiments, the at least one porous solid has a pore diameter equal to or greater than about 0.95 nm. In certain embodiments, the at least one porous solid has a pore diameter equal to or greater than about 0.9 nm. In certain embodiments, the at least one porous solid has a pore diameter equal to or greater than about 0.85 nm. In certain embodiments, the at least one porous solid has a pore diameter equal to or greater than about 0.8 nm. In certain embodiments, the at least one porous solid has a pore diameter equal to or greater than about 0.75 nm. In certain embodiments, the at least one porous solid has a pore diameter equal to or greater than about 0.7 nm. In certain embodiments, the at least one porous solid has a pore diameter equal to or greater than about 0.65 nm. In certain embodiments, the at least one porous solid has a pore diameter equal to or greater than about 0.6 nm. In certain embodiments, the at least one porous solid has a pore diameter equal to or greater than about 0.55 nm. In certain embodiments, the at least one porous solid has a pore diameter equal to or greater than about 0.5 nm. In certain embodiments, the at least one porous solid has a pore diameter equal to or greater than about 0.48 nm. In certain embodiments, the at least one porous solid has a pore diameter equal to or greater than about 0.46 nm. In certain embodiments, the at least one porous solid has a pore diameter equal to or greater than about 0.45 nm. In certain embodiments, the at least one porous solid has a pore diameter equal to or greater than about 0.44 nm. In certain embodiments, the at least one porous solid has a pore diameter equal to or greater than about 0.42 nm. In certain embodiments, the at least one porous solid has a pore diameter equal to or greater than about 0.4 nm. In certain embodiments, the at least one porous solid has a pore diameter equal to or greater than about 0.38 nm. In certain embodiments, the at least one porous solid has a pore diameter equal to or greater than about 0.36 nm. In certain embodiments, the at least one porous solid has a pore diameter equal to or greater than about 0.35 nm. In certain embodiments, the at least one porous solid has a pore diameter equal to or greater than about 0.34 nm. In certain embodiments, the at least one porous solid has a pore diameter equal to or greater than about 0.32 nm. In certain embodiments, the at least one porous solid has a pore diameter equal to or greater than about 0.3 nm. In certain embodiments, the at least one porous solid has a pore diameter equal to or greater than about 0.28 nm. In certain embodiments, the at least one porous solid has a pore diameter equal to or greater than about 0.26 nm. In certain embodiments, the at least one porous solid has a pore diameter equal to or greater than about 0.25 nm. In certain embodiments, the at least one porous solid has a pore diameter equal to or greater than about 0.24 nm. In certain embodiments, the at least one porous solid has a pore diameter equal to or greater than about 0.22 nm. In certain embodiments, the at least one porous solid has a pore diameter equal to or greater than about 0.2 nm. In certain embodiments, the at least one porous solid has a pore diameter equal to or greater than about 0.175 nm. In certain embodiments, the at least one porous solid has a pore diameter equal to or greater than about 0.15 nm. In certain embodiments, the at least one porous solid has a pore diameter equal to or greater than about 0.125 nm. In certain embodiments, the at least one porous solid has a pore diameter equal to or greater than about 0.1 nm.

As used herein, in certain embodiments the term "pore diameter" refers to an average diameter of the pore. In other embodiments, the pore diameter refers to the diameter of the pore along a certain direction or axis.

In certain embodiments, the zeolite is selected from the group consisting of a silicoaluminophosphate (such as, but not limited to, SAPO-34), an aluminosilicate (such as, but not limited to, SSZ-13), a silicate (such as, but not limited to, DDR or Deca-Dodecasil 3 Rhombohedral), and an alkali metal aluminosilicate (such as, but not limited to, 13×).

In certain embodiments, the porous solids selectively separate or uptake a light gas from other light gases. In certain embodiments, the porous solids selectively separate or uptake $CO_2$ from other light gases.

In certain embodiments, the self-cross-linking group is selected from the group consisting of terminal alkene, acrylate, methacrylate, or diene. In other embodiments, the terminal alkene comprises vinyl, halovinyl, vinyl ether, or styrene.

In certain embodiments, the non-polymerizable RTIL of Formula (I) is a compound of Formula (Ia):

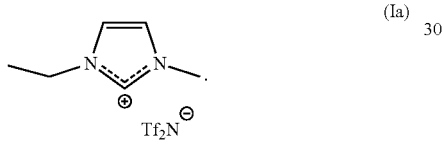

(Ia)

In certain embodiments the backbone of the [poly(RTIL)] is derived from reversible addition fragmentation chain transfer (RAFT) polymerization using a RAFT agent. Example of RAFT agent include certain trithiocarbamates, dithiocarbamates, trithiocarbonates, xanthates (dithiocarbonates), dithioates, and analogues thereof. In certain embodiments, the RAFT agent is cyanomethyldodecyl trithiocarbonate.

In certain embodiments, the [poly(RTIL)] is the polymer having Formula (II):

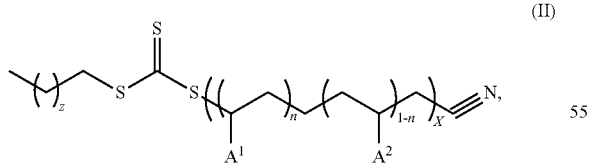

(II)

wherein $A^1$ comprises a RTIL comprising a self-cross-linking group; $A^2$ comprises a RTIL not comprising a self-cross-linking group; z is an integer ranging from 2 to 25; x is an integer ranging from 10 to 90; and n is greater than 0 and less 1.

In certain embodiments, $A^1$ comprises the side chain having Formula (IV) and A2 comprises the side chain having Formula (V):

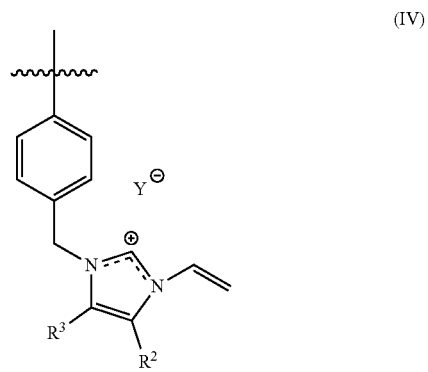

(IV)

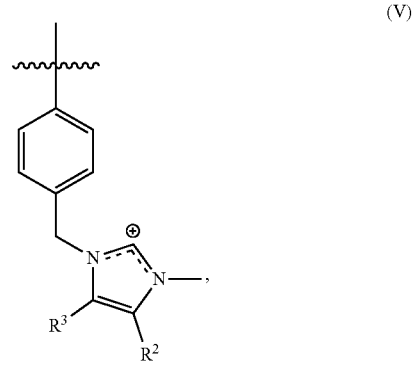

(V)

wherein: each occurrence of $R^2$ and $R^3$ is independently selected from the group consisting of H, optionally substituted $C_1$-$C_6$ alkyl, optionally substituted $C_2$-$C_6$ alkenyl, optionally $C_2$-$C_6$ alkynyl, optionally $C_1$-$C_6$ alkoxy, optionally $C_1$-$C_6$ aminoalkyl, optionally $C_1$-$C_6$ haloalkoxy, and optionally $C_1$-$C_6$ haloalkyl; and Y is an anion selected from the group consisting of $Tf_2N^-$, $BF_4^-$, $N(CN)_2^-$, $PF_6^-$, $C(CN)_3^-$, $B(CN)_4^-$, $N(SO_2F)_2^-$, $TfO^-$, $SbF_6^-$, halide, and sulfonate.

In certain embodiments, the side chain comprising Formula (IV) is the side chain of Formula (IVa) and the side chain comprising Formula (V) is the side chain of Formula (Va)

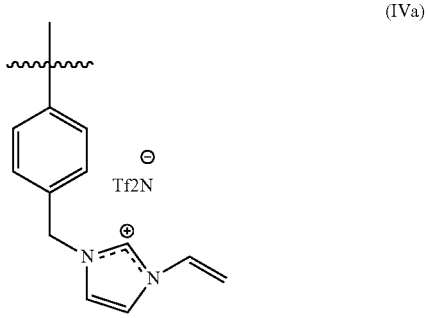

(IVa)

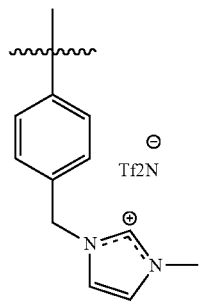
(Va)

In certain embodiments, RTILs with a self-cross-linking group side chain correspond to about 20 mol % to about 35 mol % of the total RTILs in the poly[RTIL].

In certain embodiments, the [poly(RTIL)] corresponds to about 50% to about 85% of the weight of the composition.

In certain embodiments, the RTIL corresponds to about 10% to about 35% of the weight of the composition.

In certain embodiments, the porous solids correspond to 1% to about 35% of the weight of the composition.

In certain embodiments, the composition is at least partially polymerized. In certain embodiments, the [poly(RTIL)] is formed from a curable prepolymer. In certain embodiments, the curable prepolymer is cured using UV light to yield the [poly(RTIL)].

In certain embodiments, the at least partial polymerization does not require use of any additional cross-linking agent.

In another aspect, the invention provides a mixed matrix-membrane (MMM) formed from the composition of the invention. In certain embodiments, the MMM is cast on a porous support membrane. In certain embodiments, the MMM has higher permeability for carbon dioxide than for methane. In certain embodiments, the MMM has $CO_2$ permeability of about 9 barriers to about 48 barriers. In certain embodiments, the MMM has a carbon dioxide/methane ($CO_2/CH_4$) separation selectivity of about 25:1 to about 47:1.

Methods

In yet another aspect, the invention further provides a method of selectively separating a first gas component from a gas mixture containing at least a first component and a second gas component, the method comprising contacting the gas mixture with a surface of the MMM of the invention. In certain embodiments, the MMM of the invention is as described elsewhere herein.

In certain embodiments, the first gas component selectively diffuses to the opposite surface of the membrane as compared to second gas component, thus selectively removing the first gas component over the second gas component from the gas mixture.

In one embodiment, the first gas component is carbon dioxide ($CO_2$) and the second gas component is methane ($CH_4$).

Kits

In yet another aspect, the invention provide a kit comprising the composition of the invention and an instructional material, wherein the instructional material comprises instructions for separating a first gas component from a gas mixture containing at least a first component and a second gas component using the composition of the invention. In certain embodiments, the composition of the invention is as mentioned elsewhere herein.

Every formulation or combination of components described or exemplified can be used to practice the invention, unless otherwise stated. Specific names of compounds are intended to be exemplary, as it is known that one of ordinary skill in the art can name the same compounds differently. When a compound is described herein such that a particular isomer or enantiomer of the compound is not specified, for example, in a formula or in a chemical name, that description is intended to include each isomers and enantiomer of the compound described individual or in any combination. Although the description herein contains many embodiments, these should not be construed as limiting the scope of the invention but as merely providing illustrations of some of the presently preferred embodiments of the invention.

Those skilled in the art will recognize, or be able to ascertain using no more than routine experimentation, numerous equivalents to the specific procedures, embodiments, claims, and examples described herein. Such equivalents were considered to be within the scope of this invention and covered by the claims appended hereto. For example, it should be understood, that modifications in reaction conditions, including but not limited to reaction times, reaction size/volume, and experimental reagents with art-recognized alternatives and using no more than routine experimentation, are within the scope of the present application. In general, the terms and phrases used herein have their art-recognized meaning, which can be found by reference to standard texts, journal references and contexts known to those skilled in the art. Any preceding definitions are provided to clarify their specific use in the context of the invention.

It is to be understood that wherever values and ranges are provided herein, all values and ranges encompassed by these values and ranges, are meant to be encompassed within the scope of the present invention. Moreover, all values that fall within these ranges, as well as the upper or lower limits of a range of values, are also contemplated by the present application.

The following examples further illustrate aspects of the present invention. However, they are in no way a limitation of the teachings or disclosure of the present invention as set forth herein.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the compounds of the present invention and practice the claimed methods. The following working examples therefore, specifically point out the preferred embodiments of the present invention, and are not to be construed as limiting in any way the remainder of the disclosure.

Materials

N-Vinylimidazole, and 4-chloromethylstyrene (CMS) were purchased from TCI America (Portland, Oreg.). N-Methylimidazole, cyanomethyldodecyl trithiocarbonate (RAFT agent), azobis(isobutryonitrile) (AIBN), and 2-hydroxy-2-methylpropiophenone were purchased from Sigma-Aldrich (Milwaukee, Wis.). Lithium trifluoromethanesulfonimide (LiTf$_2$N) was purchased from 3M (St. Paul, Minn.). All reagents and solvents were obtained in the highest available purity. AIBN was dissolved in methanol, recrystallized under refrigeration, filtered, and dried before use. CMS was passed through a column of activated alumina to remove radical inhibitor compounds prior to use. All other reagents and solvents were used without additional purification. Cylinders of Ar, $CO_2$, $N_2$, and $CH_4$ gas were purchased from Airgas (Randor, Pa.) and were at least 99.99% pure. YMPZ3001 ultrafiltration membrane with a molecular weight (MW) cut-off of 30 kDa was purchased from Sterlitech (Kent, Wash.). The added free RTIL, 1-ethyl-3-methylimidazolium trifluoromethanesulfonimide [EMIM][Tf$_2$N], was synthesized according to the procedure previously reported by Bara, et al., 2008, Polymers for Advanced Technologies 19:1415-1420). SAPO-34 was synthesized at Nanjing Tech University, P.R. China, using a procedure reported in prior literature (Li, et al., 2006, Advanced Materials 18:2601-2603). SAPO-34 crystals were observed to be square, flat crystals approximately 500 nm wide. FE-SEM images of these crystals are shown in the figures. The zeolite powder was calcined at 600° C. for 24 h once it was received, held in a 100° C. oven between uses, and hand-ground to a very fine powder using a mortar and pestle prior to use in order to break up agglomeration.

Instrumentation $^1$H NMR and $^{13}$C NMR spectra were acquired using a Bruker Avance-III 300 (300 MHz) NMR spectrometer. Thermogravimetric analysis (TGA) was performed using a Mettler-Toledo TGA/DSC Star 1 System equipped with a GC200 Star gas controller, and the results were analyzed using Mettler-Toledo's 'StarE Software'. Attenuated total reflectance Fourier-transform infrared (ATR-FTIR) spectra were acquired with a Nicolet 6700 FT-IR spectrometer equipped with a Pike MIRacle™ single-reflection horizontal ATR accessory. A UVP UV lamp producing wavelengths around 365 nm was used for radical photopolymerization and cross-linking. Gel permeation chromatography (GPC) for MW analysis of oligomers was performed on a Viscotek GPCmax™ VE2001 system equipped with a Viscotek Model 3580 Differential Refractive Index (RI) Detector and using THF as the eluent. The number-average MW ($M_n$) and weight-average MW ($M_w$) values obtained by GPC were based on monodisperse polystyrene MW standards purchased from Viscotek. Data on mechanical properties was obtained from a TA instruments Q-800 series dynamic mechanical analyzer. Single-gas (i.e., ideal) gas permeability and selectivity data were obtained using a time-lag apparatus previously described in literature (Bara, et al., 2007, Industrial & Engineering Chemistry Research 46:5398-404). Experiments on this apparatus were conducted at 20° C. using 1 atm of transmembrane pressure. Field-emission scanning electron microscope (FE-SEM) images were obtained with a JEOL JSM-7401F Field Emission SEM. Cross-section images were taken using an FEI Nova 600 Nanolab focused ion beam (FIB) milling instrument equipped with a dual beam for electron imaging.

Example 1: Synthesis of RAFT-Polymerized poly(4-chloromethylstyrene) (PCMS) Oligomer (2a-2d)

Figure 2:
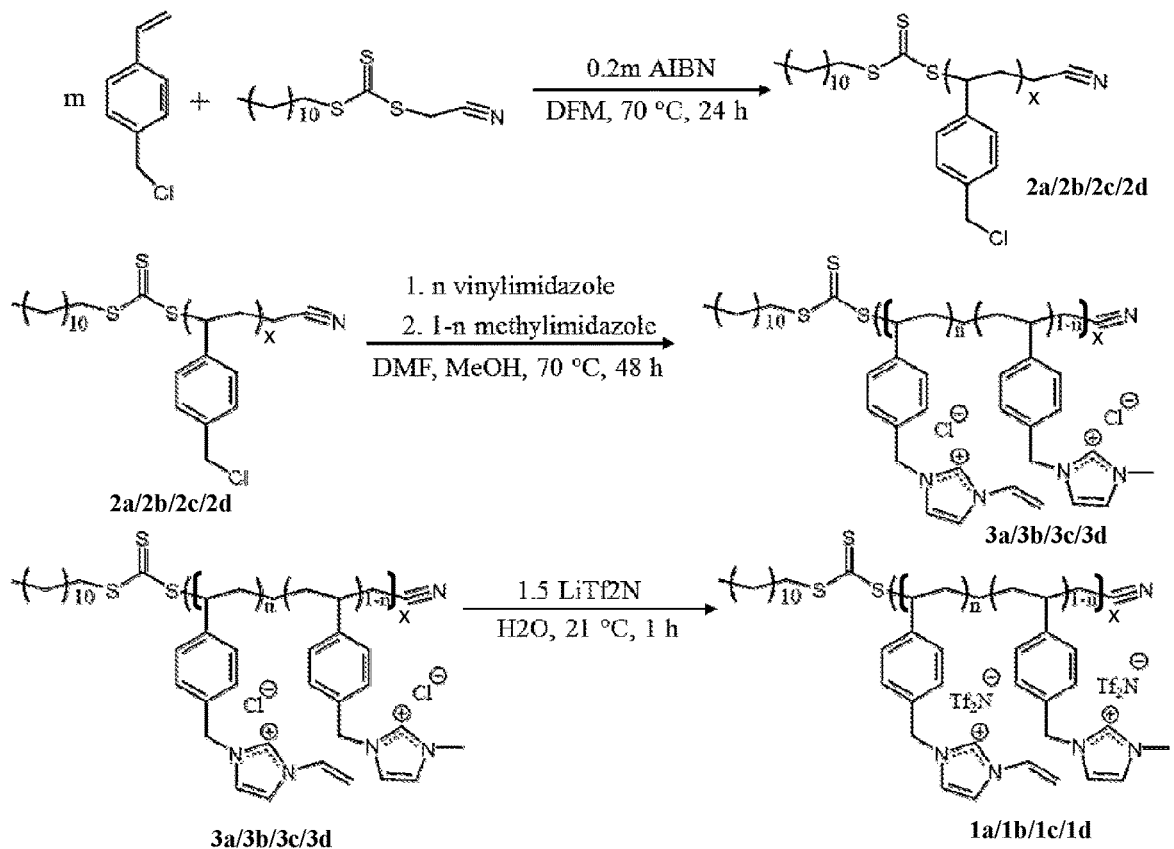
FIG. 2 shows an example of synthesis schemes for synthesizing RAFT-polymerized poly(4-chloromethylstyrene) PCMS precursor oligomers 2a-2d and then converting them to the $Tf_2N$-substituted curable RTIL prepolymers 1a-1d.

A non-limiting synthesis scheme for producing RAFT-polymerized PCMS precursor oligomers 2a-2d and then converting them to the Tf$_2$N-substituted curable RTIL prepolymers 1a-1d is shown in FIG. 2. Different $M_n$ values were targeted by adjusting the molar ratio of monomer to RAFT agent. In order to afford a PCMS X-mer, X moles of monomer were required for every one mole of chain-transfer agent and every 0.2 moles of initiator. As an example, the procedure for synthesizing a targeted 80-mer of PCMS oligomer, 2d.

Figure 3:
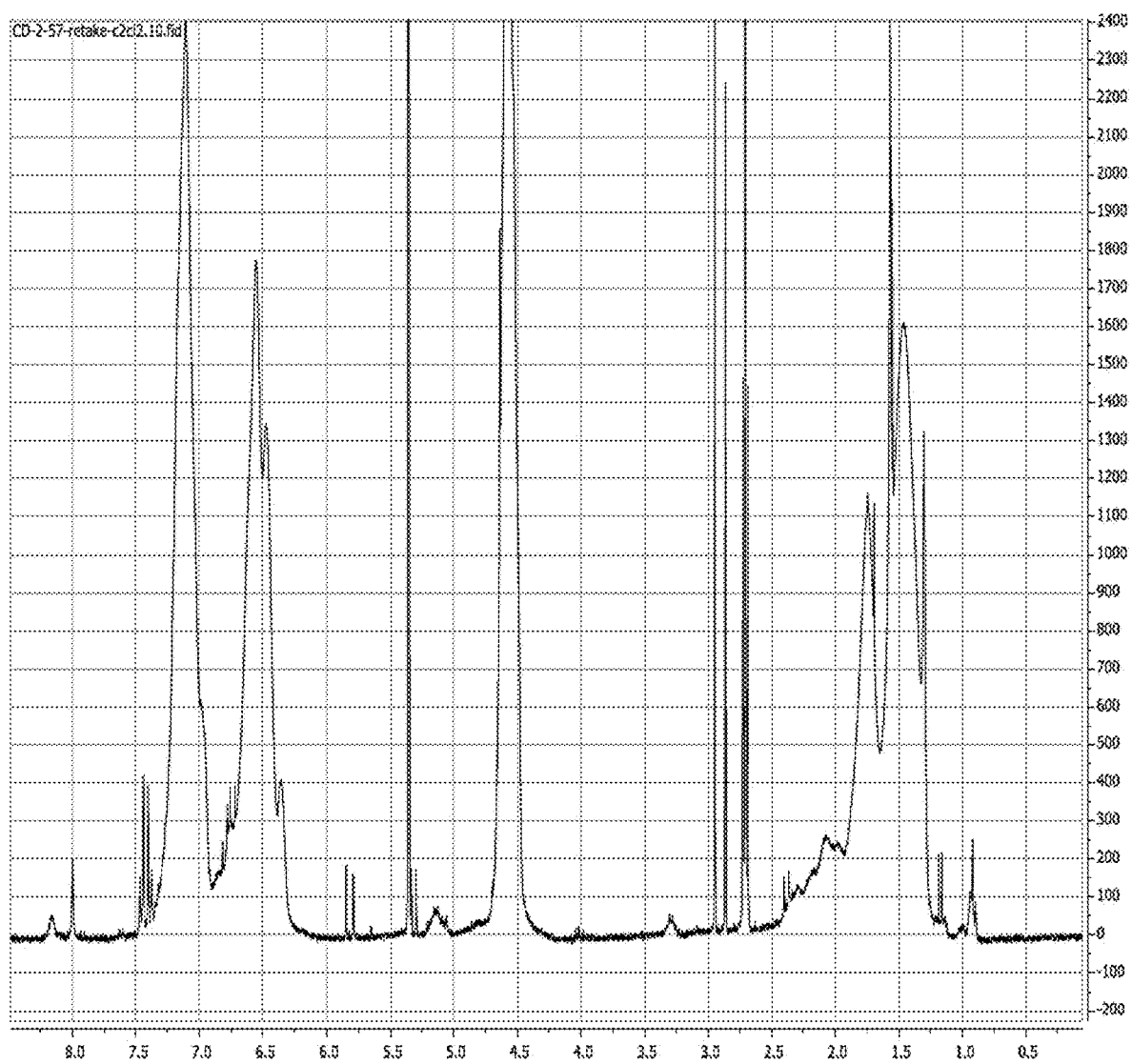
FIG. 3 shows a $^1H$ NMR spectrum (300 MHz, $CD_2Cl_2$) of PCMS oligomer 2d.

Example procedure: Purified CMS (5.00 g, 32.8 mmol) was dissolved in 5 mL of DMF and added to a 100-mL Schlenk flask equipped with a magnetic stir bar. The RAFT agent cyanomethyldodecyl trithiocarbonate (0.0885 g, 0.278 mmol) was then added to the flask. AIBN (0.0091 g, 0.0557 mmol) was then added to the flask, and stirring was started to mix the reagents. A blanket of Ar gas was passed into the flask to displace the outside atmosphere. The contents of the reaction flask were then degassed by repeated free-pump-thaw cycles using liquid nitrogen until negligible pressure increase was detected on evacuation. Once the final thaw cycle was complete, Ar gas was flowed into the flask under positive pressure, and a reflux condenser was attached. The condenser was sealed, and the Ar flow shut off. The sealed reaction system then was placed in an oil bath set to a temperature of 70° C., and the contents stirred rapidly. After stirring for 24 h at that temperature, Ar was flowed into the flask while the condenser was removed to add additional AIBN (0.0091 g) and 1 mL of DMF. Then, the condenser was replaced, and the argon flow stopped. This radical 're-initiation' process was done a total of three times, allowing 24 h to pass before each one. 24 Hours after the last addition of AIBN and DMF, the reaction flask was removed from heat and allowed to cool to ambient temperature. The polymer solution was then added dropwise into 1-L Erlenmeyer flask containing 700 mL of rapidly stirred methanol. The precipitated PCMS oligomer appeared as light yellow 'chips' of solid matter. After the methanol was decanted and the PCMS oligomer was dried in a 40° C. in vacuo for 2 h, 10 mL of TH was added to re-dissolve the oligomer. The oligomer was then re-precipitated into another 700 mL of methanol. This process was repeated a third time, and the PCMS oligomer 2d was finally dried overnight in in vacuo at 40° C. The final PCMS oligomer product was obtained as light-yellow solid chips (4.76 g, 95.2% yield). H NMR (300 MHz, CD$_2$C$_2$): δ 0.85-0.98 (br s, 0.048H), 1.03-2.46 (br m, 4H), 4.35-4.70 (br s, 2H), 6.20-6.80 (br m, 2H), 6.80-7.25 (br m, 2H) (see FIG. 3). By comparing the integrated area of the $^1$H NMR signals associated with the 4 protons on the styrene ring with that of the 2 protons on the methylene unit adjacent to a sulfur atom in the RAFT endgroup (S 3.2-3.35), oligomer $M_n$ determination by NMR endgroup analysis could be performed. GPC analysis was also used to acquire data about the degree of polymerization of the oligomers. However, the instrument was standardized using poly(styrene) standards. While CMS is relatively similar to styrene, the difference in hydrodynamic volume is sufficient to lead to slight inaccuracy when dealing with non-poly(styrene) solutions. The $M_n$, $M_w$, and polydispersity index (PDI) values of the prepared oligomers by GPC analysis, in addition to the degree of polymerization calculated from NMR and GPC data, are provided in Table 1. Given the close agreement in degree of polymerization between the two methods, the error from the use of the polystyrene instead of PMCS GPC MW standards appears to be small.

TABLE 1

GPC-measured $M_n$ and PDI values of the RAFT-polymerized PCMS precursors, and degrees of polymerization based on $^1$H NMR endgroup and GPC analyses.

| PCMS Oligomer | DP (n) from $^1$H NMR | $M_n$ from GPC | PDI from GPC | Dp (n) from GPC[a] |
|---|---|---|---|---|
| 2a | 14.19 | 2180 | 1.35 | 12.2 |
| 2b | 16.98 | 2389 | 1.41 | 19.93 |
| 2c | 56.96 | 8322 | 1.09 | 52.44 |
| 2d | 86.97 | 9192 | 1.19 | 80.44 |

[a]After accounting for the mass of the RAFT endgroups on the oligomer chains.

Example 2: Synthesis of Curable RTIL Prepolymers 1a-1d from PCMS Oligomers (2a-2d)

The following example procedure was followed for all the curable derivatization reactions for oligomers 2a-2d, differing only in quantity of reagents used. In all reactions, the molar mass contributions of the RAFT agent end groups were subtracted from the $M_n$ determined by GPC. This value was then divided by the $M_n$ to determine the percentage of the total mass that was due to repeat units.

Procedure: Curable RTIL prepolymer 1d (targeted 25% vinyl-group substitution; actual substitution 34%) was prepared by reacting PCMS oligomer 2d with 0.25 equivalents of N-vinylimidazole, and the then reacting the resulting oligomer with an excess of N-methylimidazole to ensure all chloromethyl groups are substituted with RTIL moieties. PCMS oligomer 2d (4.00 g, $M_n$=12,595, n=80.4 repeat units of chloromethylstyrene, plus the mass of the RAFT endgroups) was added to a 50-mL round-bottom flask equipped with a magnetic stir bar. N-Vinylimidazole (0.613 g, 6.52 mmol) was then added to the flask, along with 10 mL of DMF. This mixture was stirred until the polymer completely dissolved. A reflux condenser was attached to the flask, and the flask was heated to 70° C. and held at that temperature for 24 h. N-Methylimidazole (2.38 g, 29.03 mmol) and 10 mL of methanol were then added to the flask, without letting it cool, so as to avoid irreversible gelation of the reaction mixture. This reaction was run under reflux at 70° C. for another 24 h to afford the Cl$^-$ intermediate curable polymer 3d.

The solution of 3d was added dropwise to 500 mL of rapidly stirred diethyl ether, and the polymer precipitated as a sticky, off-white solid. The ether was decanted and the solids dried with air hose before re-dissolving them in 10 mL of methanol. The precipitation was repeated in another 500 mL of ether, and the ether was decanted and the solids dried in a vacuum oven at 40° C. for 24 h. Intermediate polymer 3d, was dissolved in 50 mL of deionized (DI) $H_2O$. A 1.5 times molar excess of LiTf$_2$N (11.0 g, 38.32 mmol) was dissolved in 350 mL of DI $H_2O$. The aqueous solution of polymer 3d was added dropwise to the rapidly stirred LiTf$_2$N solution, and an off-white gum immediately formed. This new precipitate was the Tf$_2$N-substituted curable RTIL prepolymer 1d. The $H_2O$ was decanted, the polymer was washed with fresh DI $H_2O$, and the polymer was dried with an air hose. The polymer was re-dissolved into 10 mL of acetonitrile and precipitated into another aqueous solution of LiTf$_2$N, made as described elsewhere herein. The polymer was again decanted, washed, and dried. This process was repeated one more time.

Figure 4:
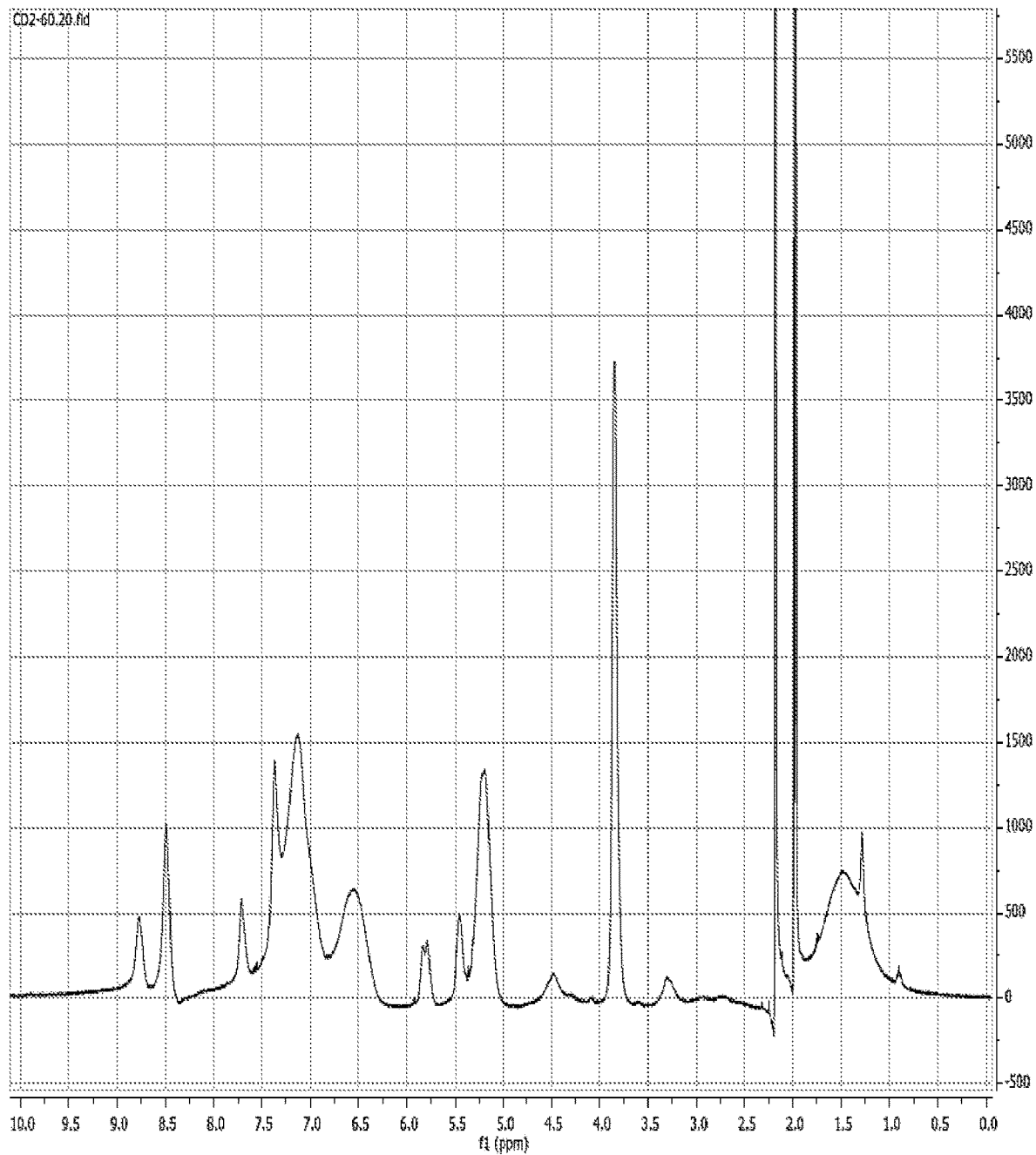
FIG. 4 shows a $^1H$ NMR spectrum (300 MHz, $CD_3CN$) of curable RTIL prepolymer 1d, derived from PCMS oligomer 2d.

The polymer was then dissolved in 10 mL of acetonitrile and precipitated into 600 mL of rapidly stirred DI $H_2O$. The water was decanted, and the polymer was washed with fresh DI $H_2O$ and dried with an air hose. This process was repeated twice more. These precipitations were done to remove residual Cl ion. The polymer was dried in a 40° C. vacuum oven for 24 h, followed by drying at 50° C. under high-vacuum conditions for 12 h. This final product was a pale-yellow solid. $^1$H NMR (300 MHz, CD$_3$CN): δ 0.80-0.94 (br s, 0.08H), 0.95-1.89 (br m, 3H), 2.05-2.20 (br s, 2H), 3.65-3.95 (br s, 1.65H), 4.97-5.55 (br d, 2H), 5.64-5.89 (br d, 0.20H), 6.20-6.80 (br m, 1.4H), 6.82-7.50 (br m, 4H), 7.56-7.79 (br s, 0.43H), 8.34-8.63 (br s, 0.61H), 8.65-8.90 (br s, 0.36H) (FIG. 4).

Due to the charged character of these curable polymers, GPC analysis was not possible and had to be limited to the uncharged oligomeric PCMS precursors. Additionally, the peak used to perform NMR end group analysis on the PCMS oligomers could not be differentiated from a separate, overlapping peak present in both 1d and 3d.

Example 3: TGA of Curable RTIL Prepolymer 1d and a (64-16-20) MMM Made Using Curable RTIL Prepolymer 1d-[EMIM][Tf$_2$N]-SAPO-34

TGA was performed on the longest curable RTIL prepolymer produced as well as on the MMM made using it. The protocol was as follows: Heating to 850° C. at 5° C./min, followed by holding at 850° C. for 1 h, all under nitrogen gas flowed at 2 mL/min. This protocol was run on the empty alumina sample pans to remove any left-over matter, and then the pans were weighed so that their mass could later be removed from that of the samples in the pans to get a true sample mass. The protocol was then run on approximately 20 mg of each sample loaded into alumina pans. Decomposition onset temperature was determined by taking the first derivative of the mass vs. time curve, identifying the inflection point, and the finding the intersection of the tangents at the inflection point and at the initial section of the curve. The final decomposition temperature was determined by locating the intersection of the tangents at the inflection point and at the final, decomposed, section of the curve. The decomposition temperature of curable RTIL prepolymer 1d was found to be 428° C. The decomposition temperature of the (64-16-20) MMM based on this polymer was found to be 418° C.

Example 4: ATR-FTIR Spectroscopy of Pre-Cross-Linked and Post-Cross-Linked Curable RTIL Prepolymer Film ATR-FTIR spectroscopy was used to observe the loss of the vinyl $CH_2$ peak (920-960 cm$^{-1}$) associated with the reactive vinyl groups on the curable polymer. The degree of vinyl conversion was calculated by taking the ratio of the integrated area underneath the vinyl peak to the area underneath a (non-reactive) internal reference peak (1000-1070 cm$^{-1}$). The equation is as follows:

$$\left\{1 - \frac{\left(\frac{[A_{vinyl}]_{cured}}{[A_{ref}]_{cured}}\right)}{\left(\frac{[A_{vinyl}]_{uncured}}{[A_{ref}]_{uncured}}\right)}\right\} * 100 = \% \text{ vinyl conversion}$$

Uncured and cured indicate measurements taken with and without a 15-min exposure to UV light, respectively. Samples from the films were placed directly on the ATR crystal.

Two neat 1d samples were produced for this spectroscopy experiment by co-dissolving curable RTIL prepolymer 1d (0.25 g) with 5 wt % 2-hydroxy-2-methylpropiophenone (0.013 g, 0.083 mmol) in acetonitrile (0.25 g). This pair of solutions were stirred with a vortex mixer for 5 min to completely dissolve the polymer. The solutions were poured onto circular quartz plates coated with RAINX™, two 150-μm-thick microscope slides were laid onto each plate as spacers, and a second RAINX™ coated plate was laid on top of each to create a sandwich. These assemblies were clamped together with 3 binder clips. One was placed underneath a 365 nm UV lamp for 15 min to trigger cross-linking, while the other was kept away from UV light. The measured UV intensity at the distance to the plates was 4.3 mW/cm$^2$. The clips were removed from both sets of plates, and both sets of plates were separated and loaded into a 40° C. vacuum oven for 1 h to remove solvent. Both films were then analyzed by ATR-FTIR spectroscopy as explained above. Based on these measurements, 99.95% of the vinyl groups present had been reacted in the cured film.

Example 5: Synthesis of Free Standing (Cross-Linked [Poly(RTIL)]-RTIL-Zeolite) MMMs Using 64 wt Curable RTIL Prepolymer, 16 wt % [EMIM][Tf$_2$N], and 20 wt % SAPO-34

The following procedure was used to synthesize all (64-16-20) MMMs in this work, and a procedure using curable RTIL prepolymer 1d will be used as an example. Previously calcined SAPO-34 powder (0.100 g) was removed from its 100° C. storage oven and added to a ceramic mortar and manually ground with a pestle until no grit or resistance could be felt (approximately 15 min of grinding). The ground zeolite was added to a small glass vial equipped with a micro stir bar. Curable RTIL prepolymer 1d (0.320 g) and [EMIM][Tf$_2$N] (0.080 g, 0.205 mmol) were added to this vial, along with 0.250 g of acetonitrile. This vial was then submerged in an ultra-sonication bath for 1 h, before being transferred to a stir plate, and rapidly stirred for 24 h to ensure maximum particle wetting and dispersion. 5 wt % (0.020 g, 18.57 μL) of the radical photo-initiator 2-hydroxy-2-methylpropiophenone was added to the vial via micropipette and the solution was stirred for another 15 min.

The contents of the vial were poured onto the center of a quartz plate treated with RAINX™. A glass pipette was used to manually remove any visible bubbles from the mixture on the plate. Two 150-μm-thick glass microscope slides were placed at the edge of the plate to act as spacers, and a second RAINX™-coated plate was laid on top of the first to create a 'sandwich'. Three (3) evenly spaced binder clips were attached to the edge of this sandwich to secure it together. This assembly was then placed under a UV lamp emitting 365 nm light at an intensity of 4.3 mW/cm$^2$ for 2 h. After irradiation, the binder clips were removed to release compression on the plates, and solvent was allowed to slowly evaporate from the edges of the assembly for 24 h. The plates were then taken apart, and the membrane, still on its plate, was placed into a 40° C. vacuum oven for at least 4 h. Once dried, the membrane was peeled from its plate, and stored in a plastic Petri dish. ATR-FTIR spectroscopy was used to qualitatively check for the stretch associated with the C—N triple bond in acetonitrile to ensure solvent removal and adequate drying. A digital micrometer was used to measure film thickness, with membrane thickness ranging from 90-150 μm.

Example 6: Synthesis of Free Standing (Cross-Linked [Poly(RTIL)]-RTIL-Zeolite) MMMs Using 80 wt % Curable RTIL Prepolymer, 20 wt % [EMIM][Tf$_2$N], and 0 wt % SAPO-34

The following procedure was used to synthesize all (80-20-0) ion-gel membranes in this work, and a procedure using curable RTIL prepolymer 1d can be used as an example. Curable RTIL prepolymer 1d (0.400 g) and [EMIM][Tf$_2$N] (0.100 g, 0.256 mmol) were added to a small glass vial equipped with a micro stir bar, along with 0.250 g of acetonitrile. This vial was then transferred to a stir plate, and rapidly stirred for 24 h. 5 wt % (0.025 g, 23.21 μL) of the radical photo-initiator 2-hydroxy-2-methylpropiophenone was added to the vial via micropipette, and the solution was stirred for another 15 min.

The contents of the vial were poured onto the center of a quartz plate treated with RAINX™. A glass pipette was used to manually remove any visible bubbles from the mixture on the plate. Two 150-μm-thick glass microscope slides were placed at the edge of the plate to act as spacers, and a second Rain-X™-coated plate was laid on top of the first to create a 'sandwich'. Three (3) evenly spaced binder clips were attached to the edge of this sandwich to secure it together. This assembly was then placed under a UV lamp emitting 365 nm light at an intensity of 4.3 mW/cm$^2$ for 2 h. After irradiation, the binder clips were removed to release compression on the plates, and solvent was allowed to slowly evaporate from the edges of the assembly for 24 h. The plates were then taken apart, and the membrane, still on its plate, was placed into a 40° C. vacuum oven for at least 4 h. Once dried, the membrane was peeled from its plate, and stored in a plastic Petri dish. ATR-FTIR spectroscopy was used to qualitatively check for the stretch associated with the C—N triple bond in acetonitrile to ensure solvent removal and adequate drying. A digital micrometer was used to measure film thickness, with membrane thickness ranging from 110-140 μm.

Example 7: Modulus of Elasticity Comparisons Between Curable RTIL Prepolymer-Based Systems and Curable RTIL Monomer-Based Systems In order to demonstrate the difference in mechanical properties observed between MMMs made with uncontrolled radical polymerization of RTIL-monomer (viz. [1-vinyl-3-methylimidazolium][Tf$_2$N]) versus those made with cross-linking of curable RTIL prepolymers, a DMA instrument was employed to determine the modulus of elasticity for films of both the neat polymers, and (64-16-20) MMMs made from these polymers containing [EMIM][Tf$_2$N] and SAPO-34. The instrument was run in constant-strain mode, with an elongation rate of 0.1% strain/min, automatically adjusted based on the dimensions of the sample coupon. Stress vs. strain data was recorded, and the onboard software was used to determine the modulus of elasticity as the slope of the initial linear section of the stress vs. strain curve. It should be noted that even though all samples were over 100 μm thick, the neat [VMIM][Tf$_2$N] films were so fragile that only 1 out of 16 attempts to measure the modulus of elasticity actually yielded data. All other attempts resulted in fracture of the film on loading, or fracture upon application of initial stress. For all other samples, data was obtained in triplicate and the mean value was reported. For all samples except [VMIM][Tf$_2$N], the error represents the standard deviation in the values.

Neat films were prepared by combining 0.25 g of curable RTIL polymer or RTIL monomer in a vial equipped with a stir bar with 5 wt % 2-hydroxy-2-methylpropiophenone (0.0125 g, 11.6 μL) and 0.25 g acetone. To allow the RTIL monomer to cross-link, 2 wt % of divinylbenzene (DVB) was added to the vial. These vials were stirred for 1 h and poured onto quartz plates coated in RAINX™. The UV polymerization and drying procedure was the same as given elsewhere herein. MMMs were produced using the same procedure reported elsewhere herein, with the difference that 2 wt % divinylbenzene was added to the RTIL-monomer-based MMM along with the photo-initiator to facilitate cross-linking.

TABLE 2

Modulus of elasticity comparison between neat films and MMMs made with curable RTIL prepolymers and curable RTIL monomer casting solutions.

| Sample ID | Modulus of elasticity (MPa) |
|---|---|
| Curable RTIL prepolymer 1d | 490 ± 80 |
| [VMIM][Tf2N] + 2 wt % DVB | 858 |
| (64-16-20) MMM with RTIL prepolymer 1d | 70 ± 20 |
| (64-16-20) MMM with RTIL monomer | 170 ± 50 |

These results suggest that there are large differences in the elasticity of the cured RTIL prepolymer compared to the polymerized monomer. The MMMs show substantial decreases in their modulus, likely due to the plasticizing effects of free ionic liquid in the polymer matrix. These effects are more pronounced in the MMM synthesized using curable RTIL prepolymer 1d.

Example 8: Comparative Support Penetration Evaluations for Neat Solutions of Curable RTIL Prepolymers 1a and 1d and RTIL Monomer [VMIM][Tf$_2$N]

To evaluate the ability of curable RTIL prepolymers to resist penetrating into an ultrafiltration support, several 50 wt % solution of neat polymer and monomer were prepared. 0.15 g of [VMIM][Tf$_2$N] and curable RTIL prepolymers 1a and 1d were added to vials equipped with stir bars. One wt % 2-hydroxy-2-methylpropiophenone (0.0015 g, 1.39 μL) was added to the monomer vial along with 2 wt % divinylbenzene (0.003 g, 3.28 μL). 5 wt % 2-hydroxy-2-methylpropiophenone (0.0075 g, 6.96 μL) was added to the prepolymer vials. 0.15 g of acetone was added to all 3 vials, which were all stirred on a vortex mixer until all solids had dissolved.

The solutions were added dropwise to separate, preweighed pieces of a ultrafiltration (UF) membrane with a MW cut-off of 30 kDa (Sterlitech PZ series). Half of the samples were exposed to 365 nm UV light for 15 min. All samples were then dried in a 40° C. vacuum oven for 1 h. The dry masses of the samples were recorded, with the difference between these masses and the initial support masses being equal to the total amount of polymer present. A razor blade was then used to carefully peel and scrape away as much of the added polymer as possible without damaging the UF support. The samples were then weighed a third time, and the fraction of added polymer that could not be removed was calculated and is given as '% mass penetrated'. The reported values are averages of three experiments, with error given by the standard deviation in the values.

TABLE 3

Mass Penetration of 50 wt % Solutions of Curable RTIL Prepolymer or ([VMIM][Tf$_2$N] RTIL Monomer + 2 wt % DVB) in Acetone into an Ultrafiltration Membrane with a 30 kDa MW Cutoff

| curable RTIL prepolymer or RTIL monomer system | mass % penetration into porous support |
|---|---|
| [VMIM][Tf$_2$N] + 2 wt % DVB, uncured | 70 ± 20 |
| [VMIM][Tf$_2$N] + 2 wt % DVB, cured | 67 ± 9 |
| 1a, uncured | 7 ± 1 |
| 1a, cured | 6 ± 2 |
| 1d, uncured | 11 ± 8 |
| 1d, cured | 3.7 ± 0.9 |

A series of casting solution "soak-through" tests were performed using the support penetration behavior of a cross-linkable RTIL monomer solution of the same weight percent loading as a reference. RTIL monomer [VMIM][Tf$_2$N] with 2 wt % DVB cross-linker was used to the represent older, monomer-based systems. Table 3 shows the wt % values of RTIL prepolymer or monomer added to a support that could not be recovered due to penetration. From the data presented in Table 3, it is clear that 50 wt % solutions of ([VMIM][Tf$_2$N]+DVB) in acetone, with or without UV curing, readily penetrate into the underlying porous support structure rather than forming a distinct, continuous film on top of it. Upon comparison of the curable RTIL prepolymer solution performances, a 50 wt % solution of the curable RTIL prepolymer 1d (x=87) in acetone penetrated the support the least when photocured immediately after application. These data suggest that even relatively short curable RTIL prepolymers are significantly more capable of resisting support penetration than their monomer counterparts.

Example 9: Qualitative Comparative Gelation Study of Ion-Gels Made with RTIL Monomer [VMIM][Tf$_2$N] and Curable RTIL Prepolymers 1a and 1d In order to better understand the relationship between polymer chain length and the time required to 'set' or form an immobile gel, a series of gelation experiments were carried out between the curable RTIL prepolymers (x=14 and x=87) and compared to that performed with a cross-linkable, low-MW RTIL monomer as a reference system. Three solutions containing 40 wt % [EMIM][Tf$_2$N] were prepared by the following method. Either the monomer or curable RTIL prepolymer (0.395 g) was added to a vial equipped with a stir bar. [EMIM][Tf$_2$N] (0.595 g), along with 1 wt % (0.010 g, 9.19 μL) 2-hydroxy-2-methylpropiophenone, were added to the vial. In order to completely dissolve the curable RTIL prepolymer and monomer components into the free RTIL, 0.200 g of acetone was added to the vial, followed by vortex mixing. The vials were then placed in a 40° C. vacuum oven for 3 h to remove the acetone. This resulted in a highly viscous solution of curable RTIL prepolymer or RTIL monomer dissolved in [EMIM][Tf$_2$N].

The relative gelation rates of RTIL solutions featuring [VMIM][Tf$_2$N]+2 wt % DVB and those containing curable RTIL prepolymers 1a and 1d dissolved in [EMIM][Tf$_2$N]

were conducted by comparing the ability of the solutions to "flow" after exposure to UV light, which initiates radical cross-linking (Carlisle, et al., 2014, Chem. Mater. 26:1294-1296). This method involves adding drops of the different solutions to cuvettes, turning the cuvettes on their sides, and observing how the curable solutions moved as a function of time before flow stopped (i.e., onset of gelation).

Four to five drops of these solutions were added to separate cuvettes made of UV transparent plastic. These small containers have a narrow, rectangular cavity that allows for convenient observation of the solution inside. Multiple cuvettes were prepared for each solution, and exposed to 365 nm UV light for different lengths of time. After UV exposure, the cuvettes were turned on their sides and photographed. Solutions that have completely gelled will not flow from the bottom of the cuvette when turned, and more completely gelled solutions will be more resistant to flow than less completely gelled solutions.

Figure 5:
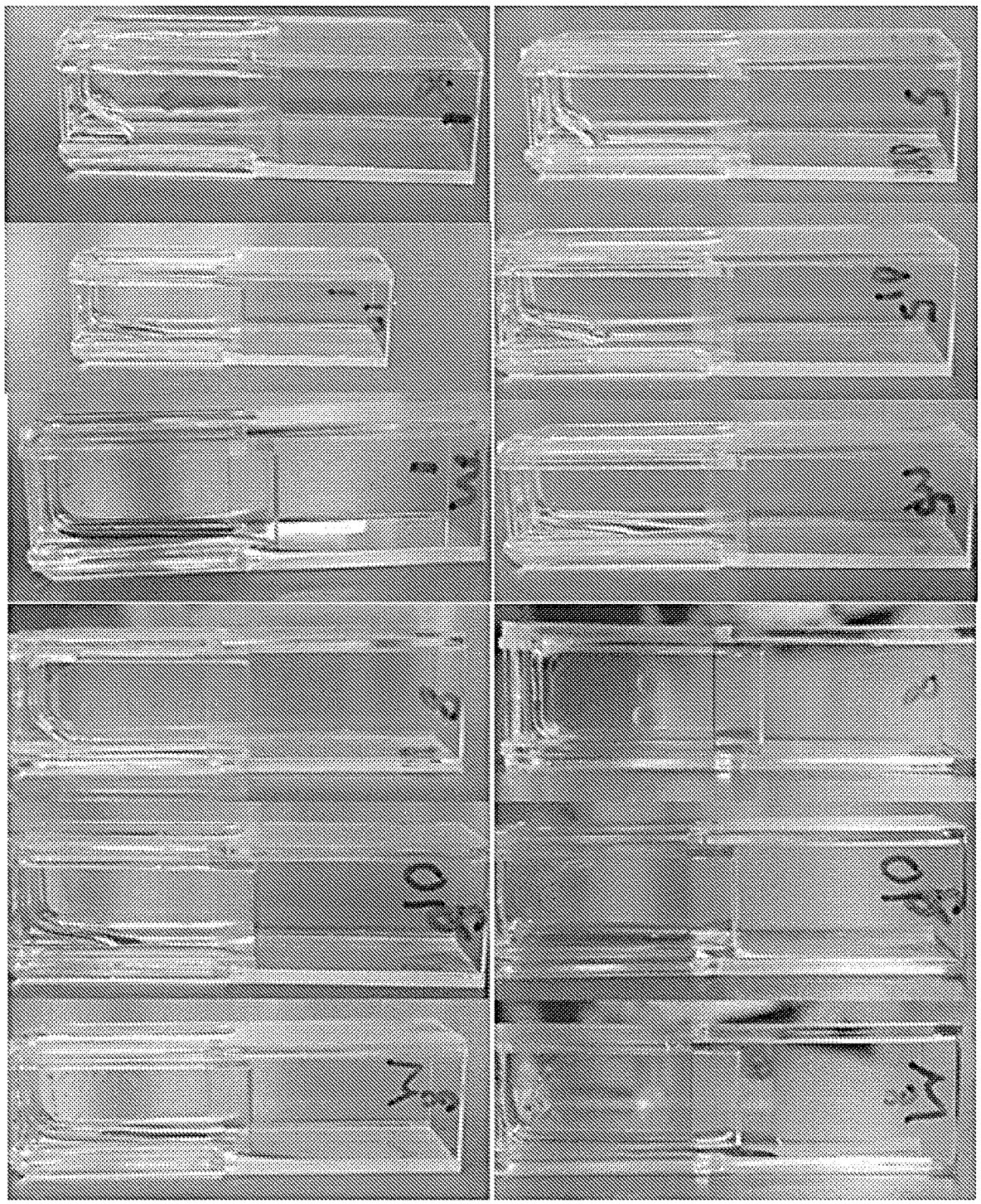
FIG. 5 show pictures of cuvettes containing curable RTIL prepolymer-RTIL solutions after UV light exposure. From the top left to right, UV exposure time is 5 s, 25 s, 90 s, and 300 s.
Figure 6:
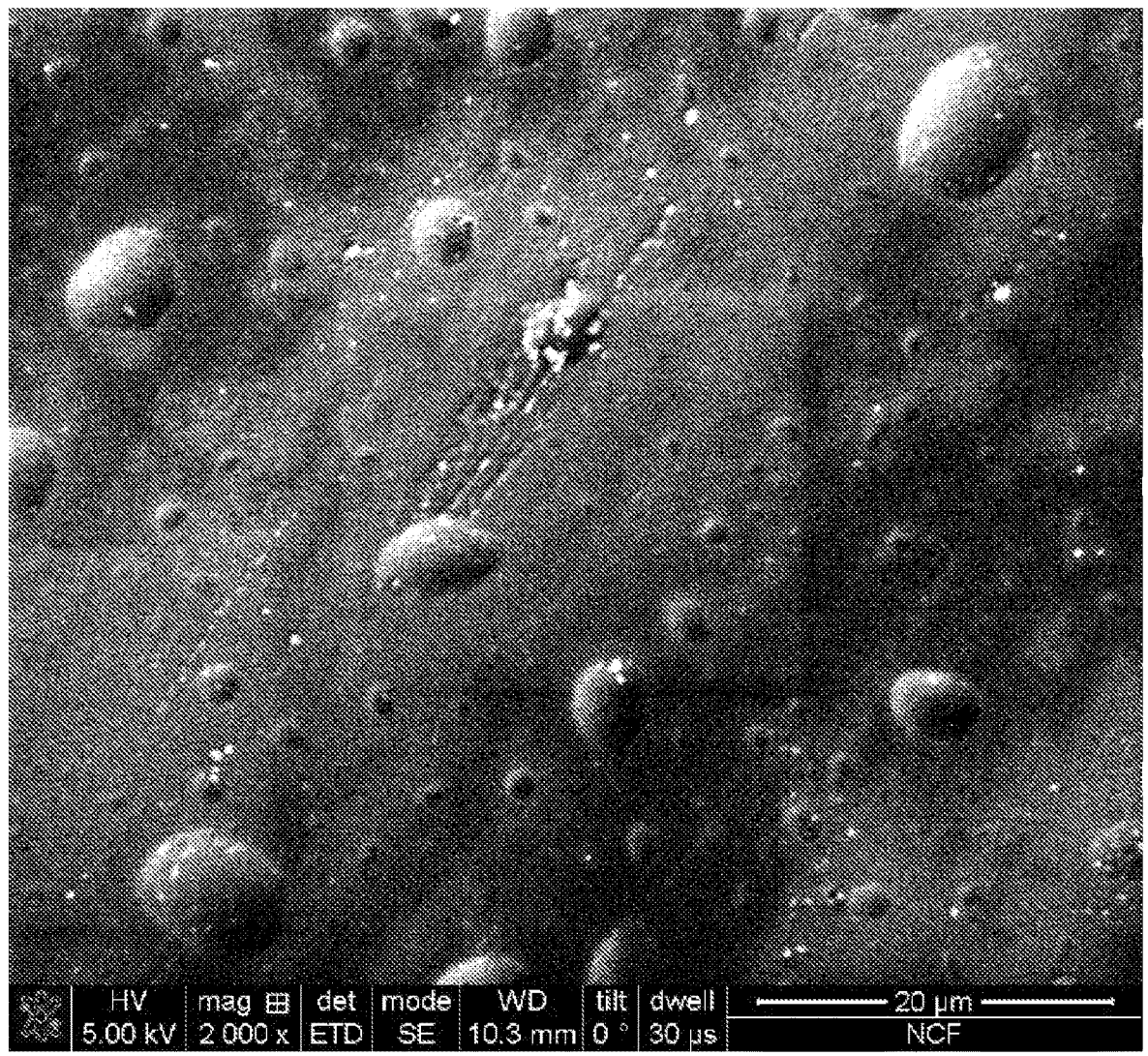
FIG. 6 shows a surface SEM image of a (80-20-0) MMM based on curable RTIL prepolymer 1d.
Figure 7:
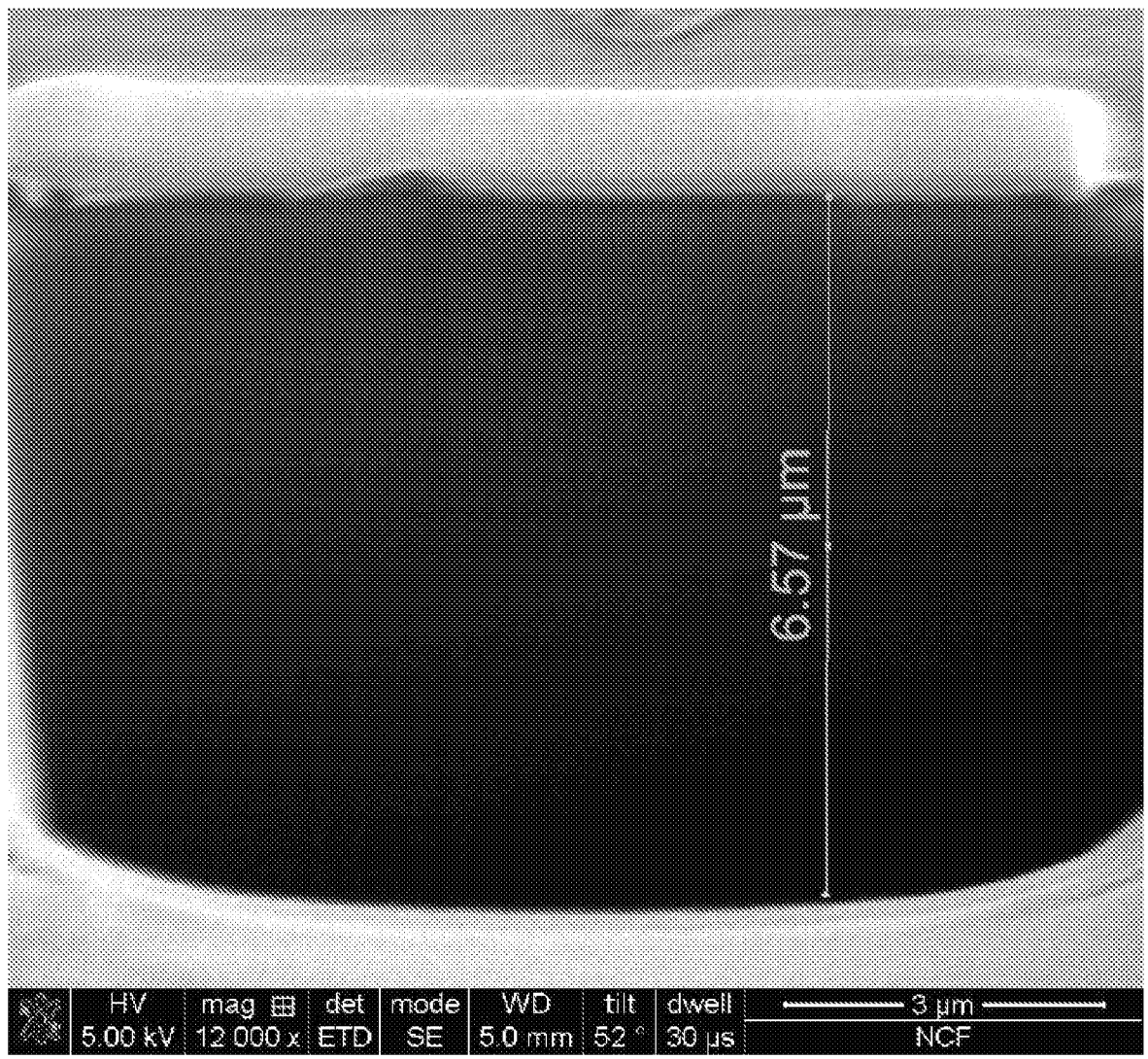
FIG. 7 shows a cross-section SEM image of a (80-20-0) MMM based on curable RTIL prepolymer 1d.
Figure 8:
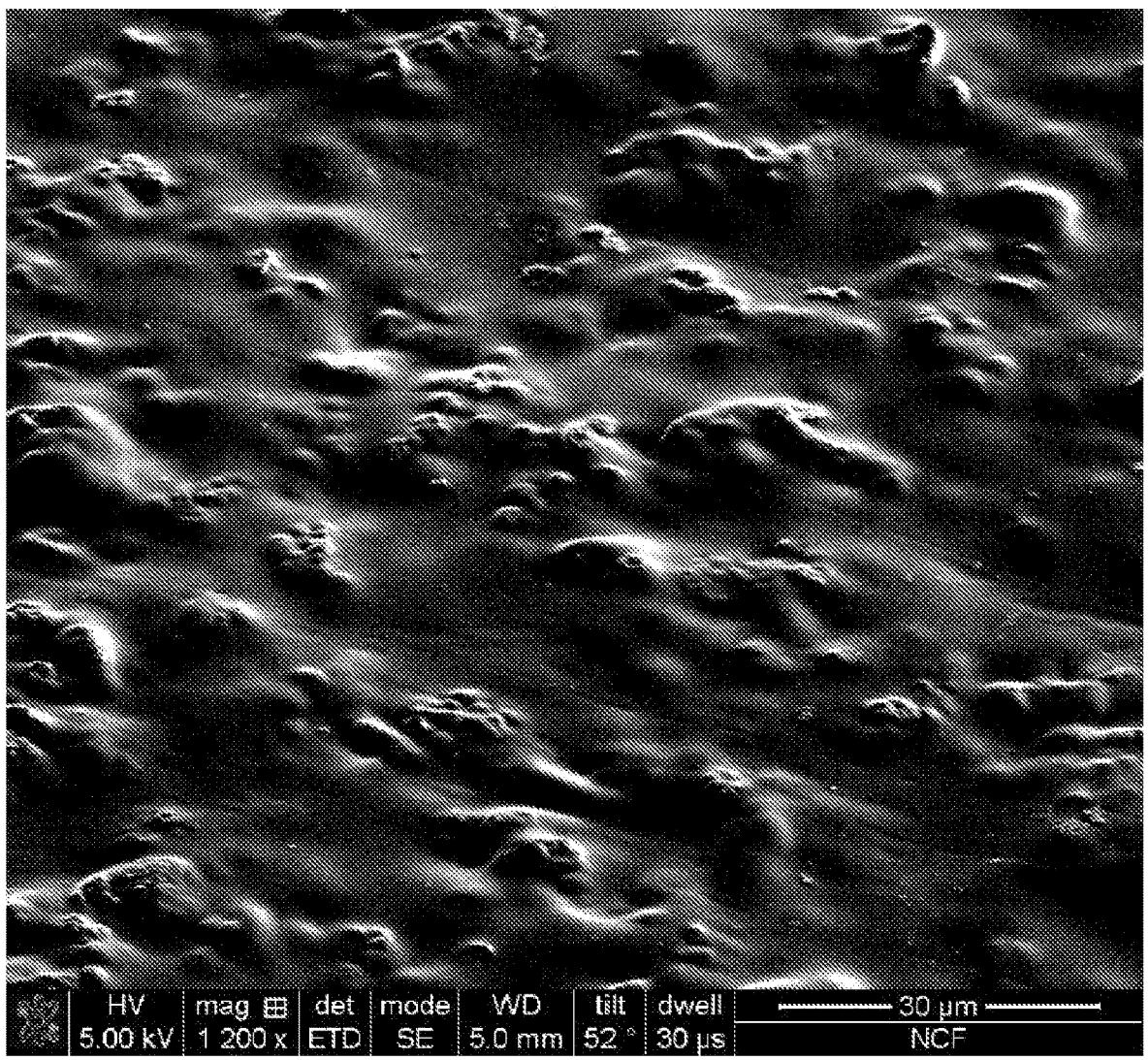
FIG. 8 shows a surface SEM image of a (64-16-20) MMM based on curable RTIL prepolymer 1d.
Figure 9:
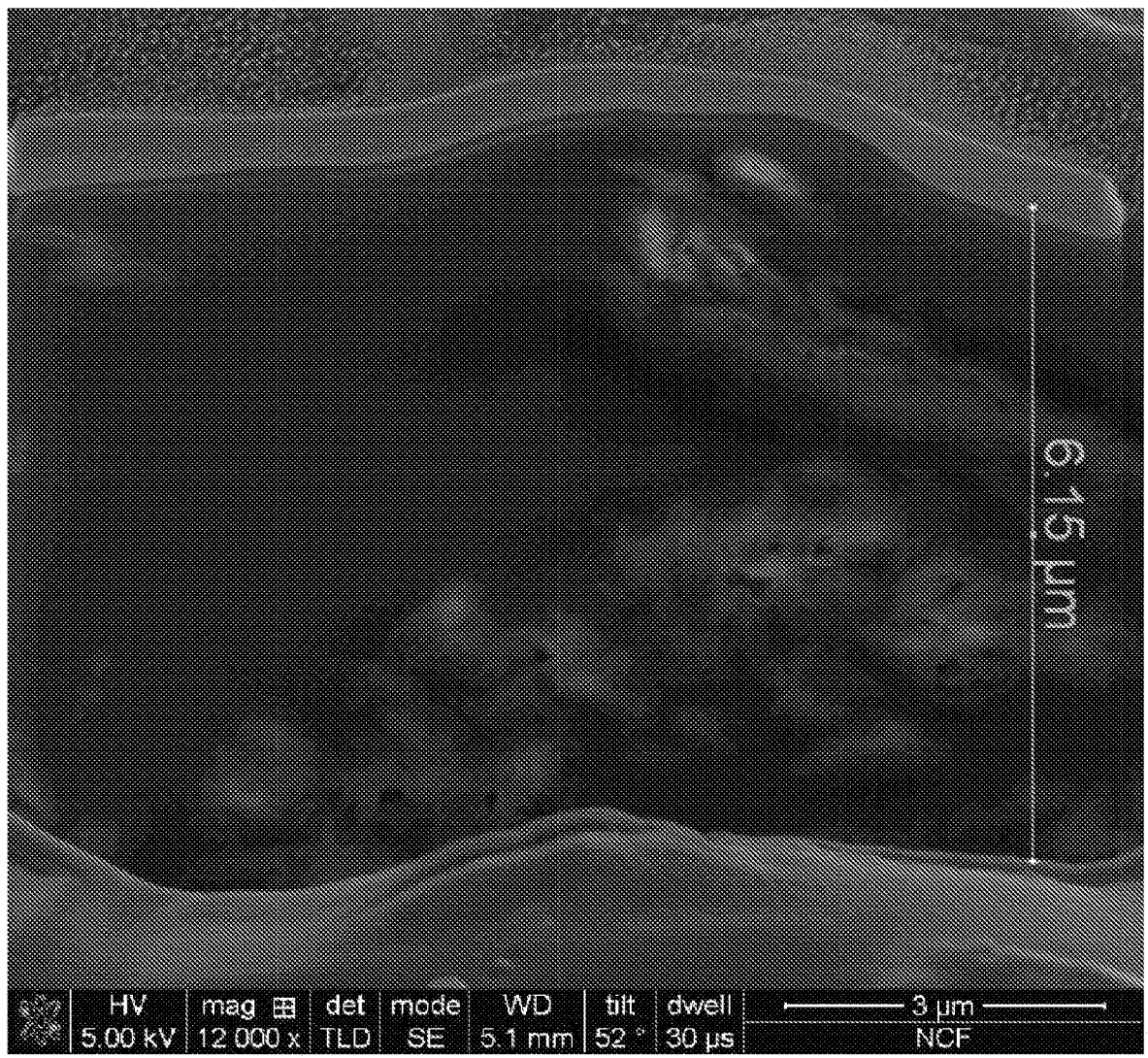
FIG. 9 shows a cross-section SEM image of a (64-16-20) MMM based on curable RTIL prepolymer 1d.
Figure 10:
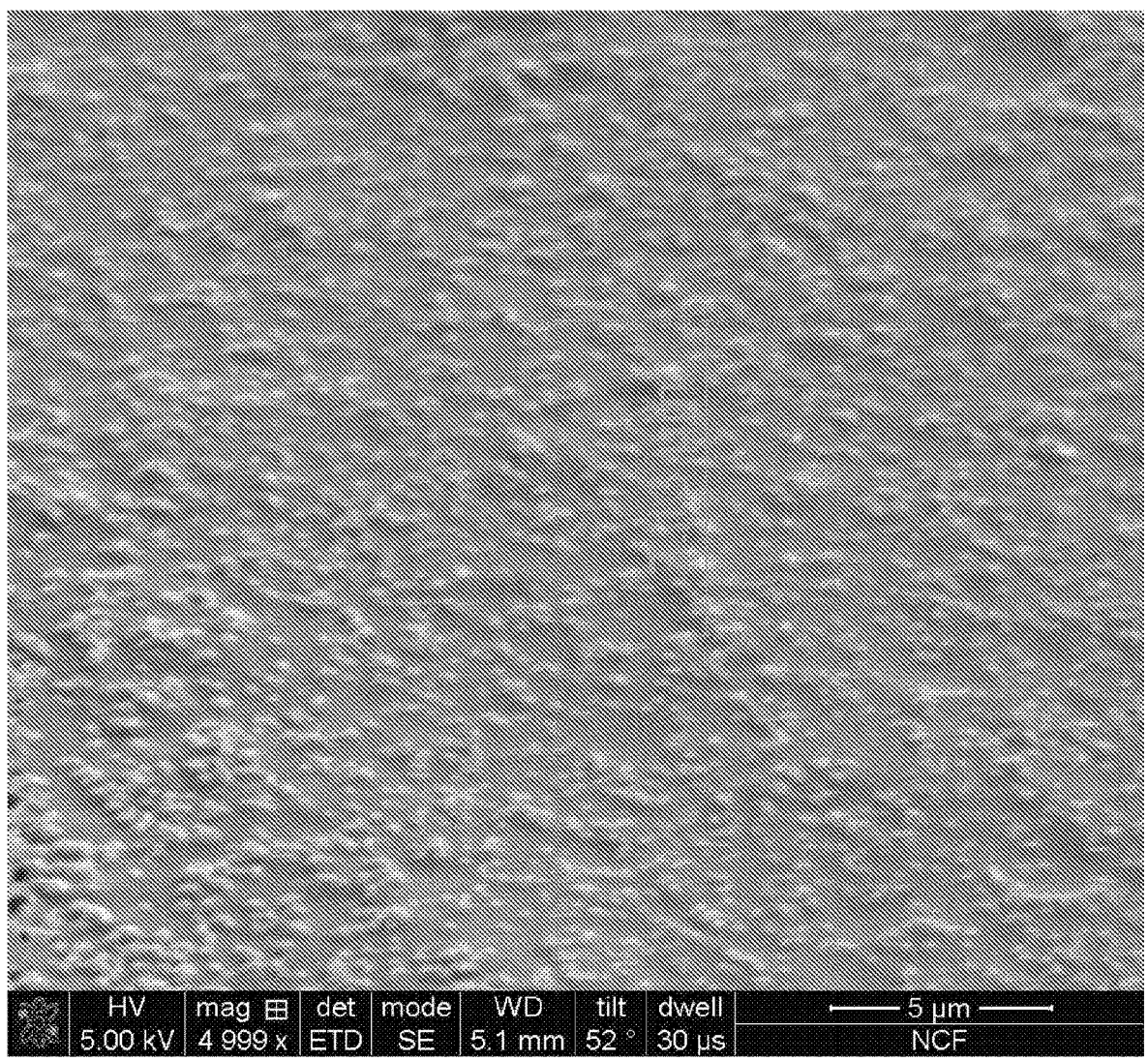
FIG. 10 shows a surface SEM image of a (64-16-20) MMM based on curable RTIL prepolymer 1b.
Figure 11:
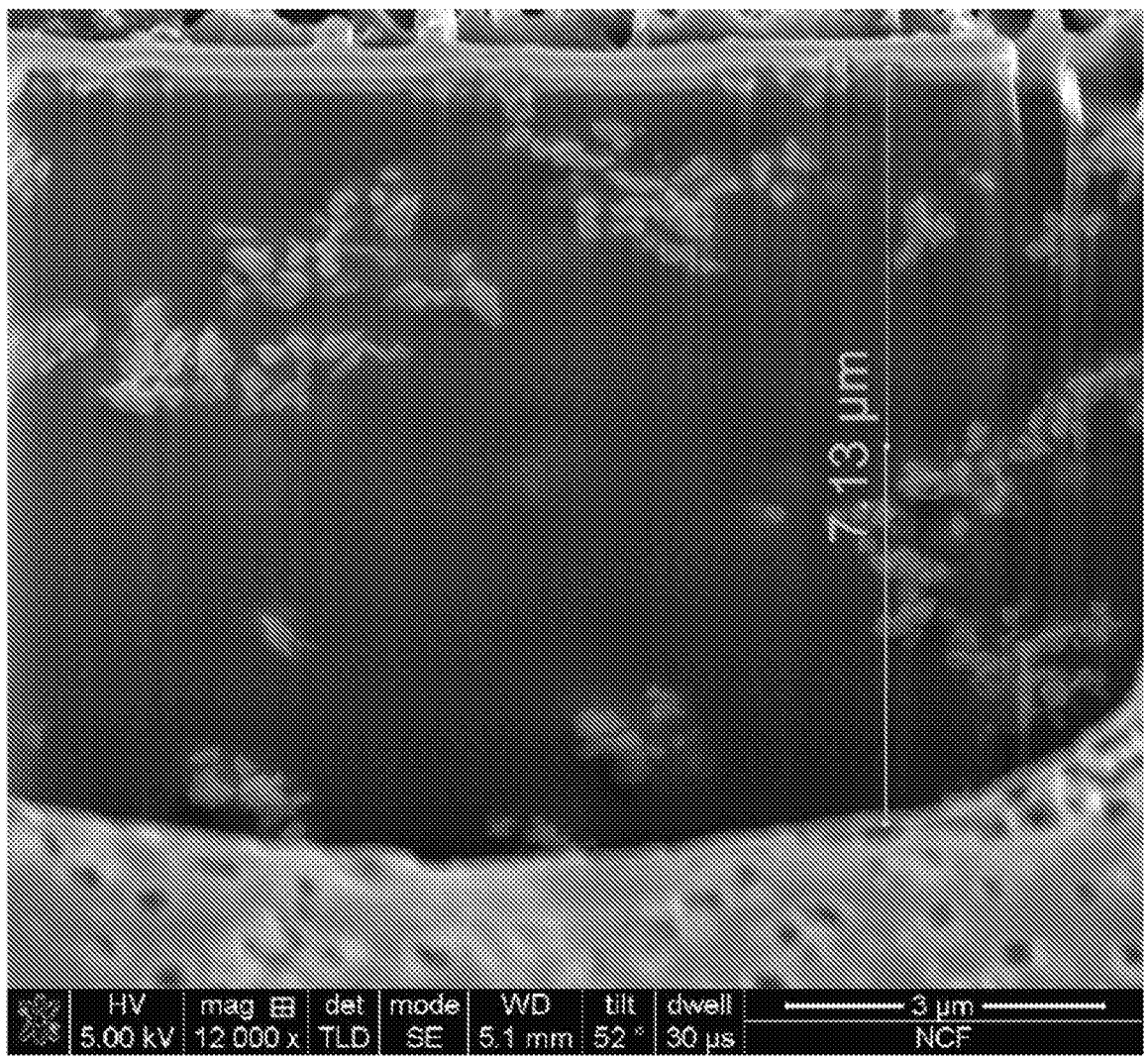
FIG. 11 shows a cross-section SEM image of a (64-16-20) MMM based on curable RTIL prepolymer 1b.
Figure 12:
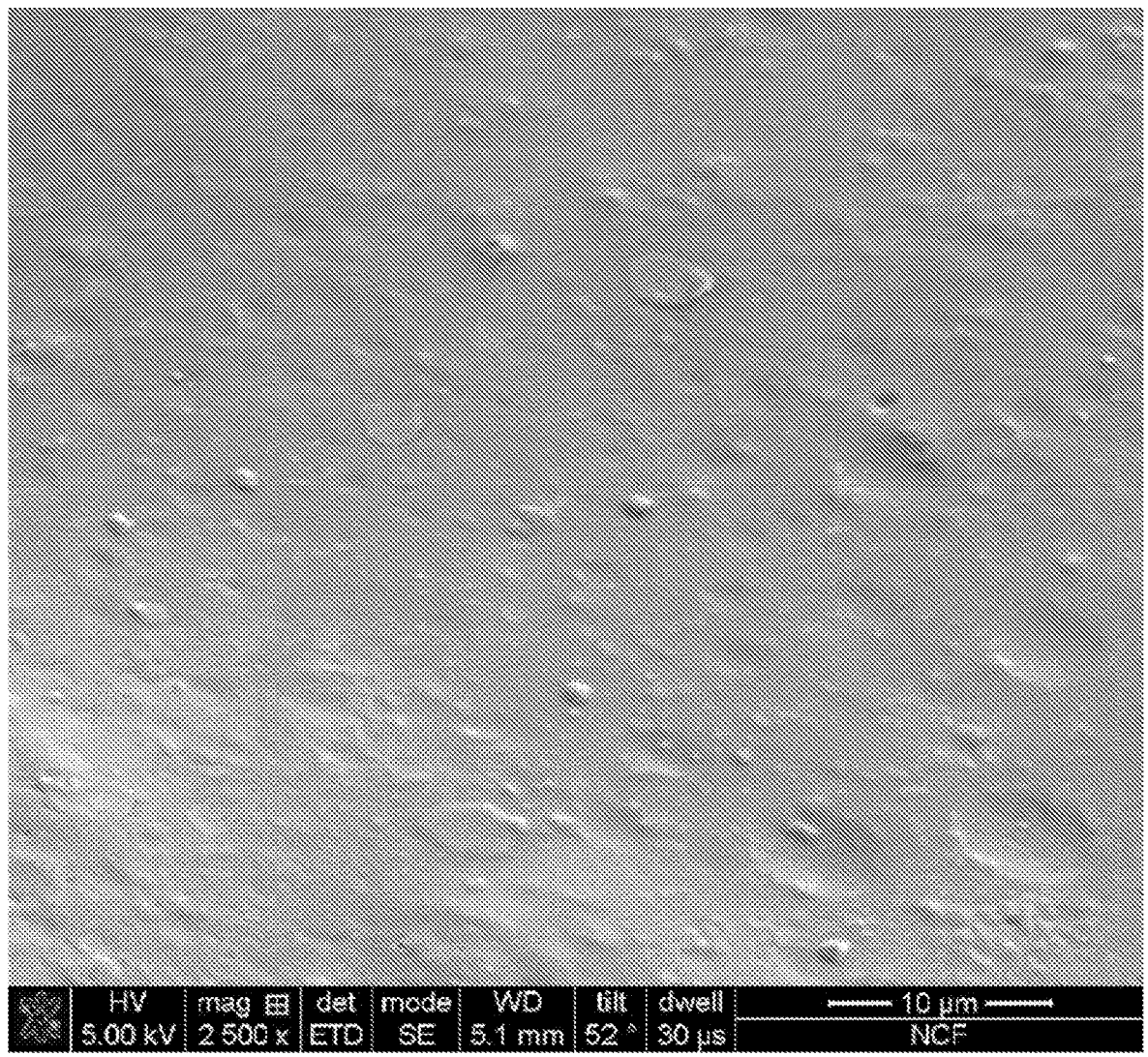
Figure 13:
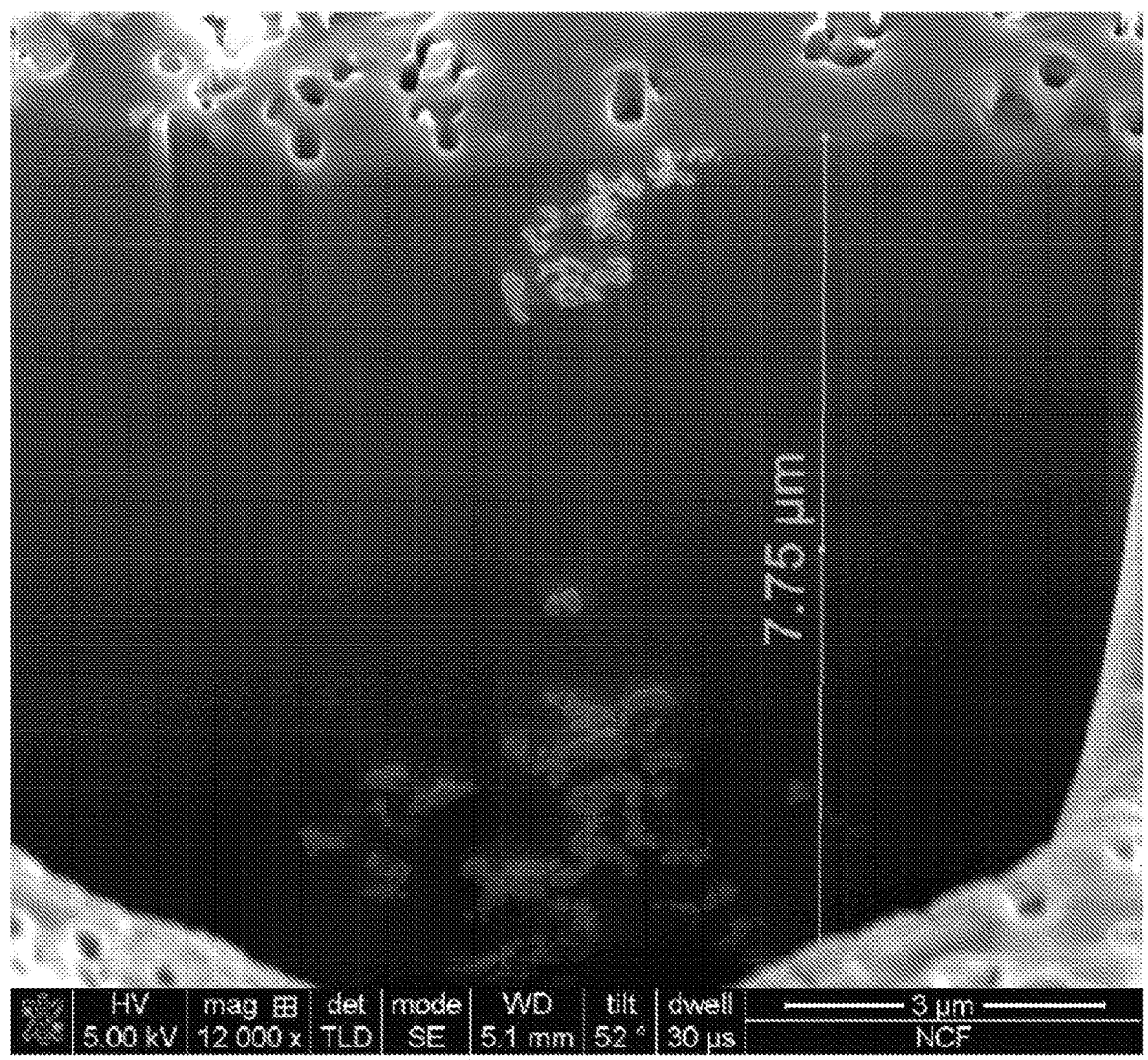
Figure 14:
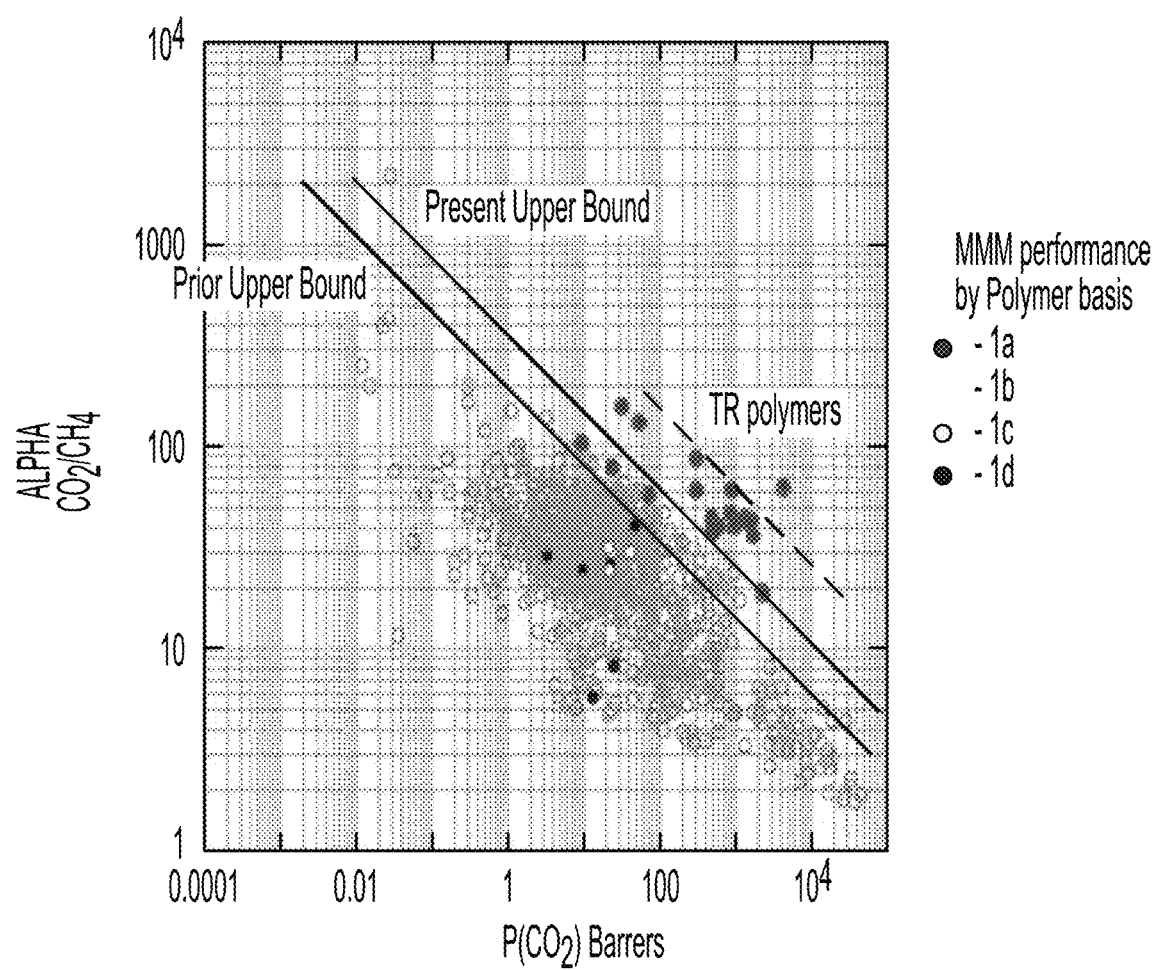
FIG. 14 is a graph showing $CO_2/CH_4$ Robeson plot that includes data points for the curable oligomer-based MMMs synthesized and tested in the current study.
Figure 15:
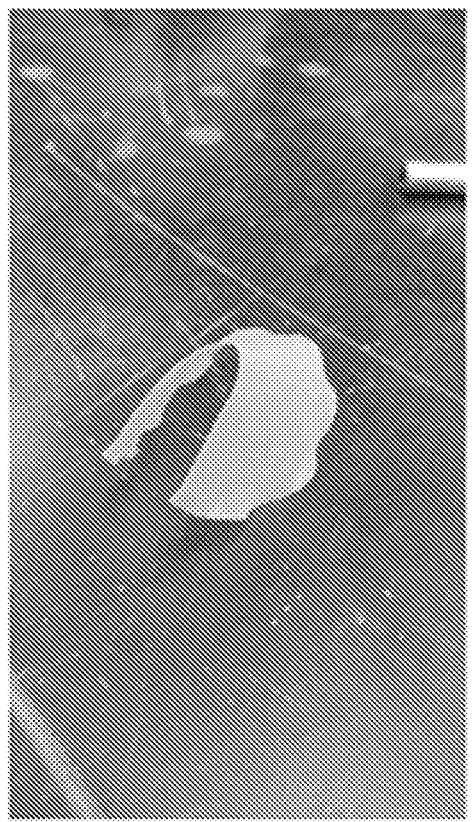
FIG. 15 show pictures of a three-component MMM made from curable imidazolium-based [poly(RTIL)], free RTIL, and SAPO-34 zeolite.
Figure 15:
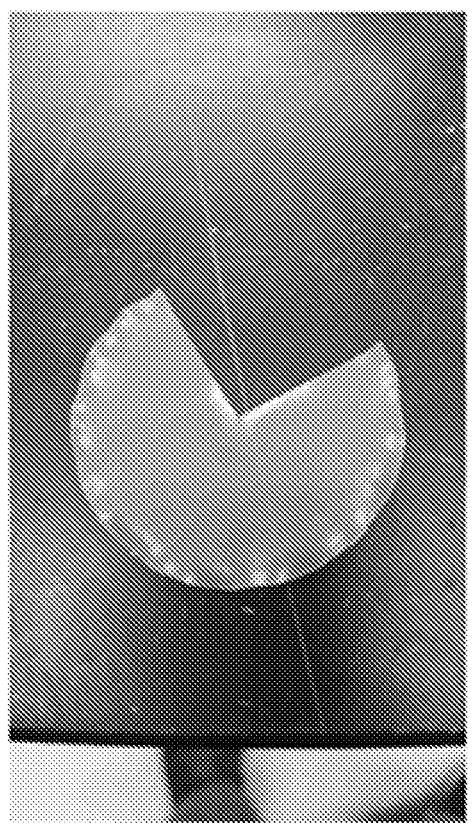

In the images in FIG. 5, the cuvettes are ordered from top to bottom as curable RTIL prepolymer 1d, curable RTIL prepolymer 1a, poly([VMIM][Tf$_2$N]). Starting from the top left and moving right, the images show vials exposed to UV light for 5 s, 25 s, 90 s, and 300 s. In the 300 s image, the vials were left on their sides for 1 hour before being photographed to ensure that an immobile gel had formed. Even in images where all three solutions are flowing, it is clear that solutions of curable RTIL prepolymer 1d are more viscous and resistant to flow compared to solutions of curable RTIL prepolymer 1a, which in turn are more viscous than solutions of [VMIM][Tf$_2$N]. After leaving the solution covered for 1 week, the RTIL monomer solution still had not gelled, while curable RTIL prepolymer 1a had. These results suggest in non-limiting manner that polymer chain length has an effect on the speed of gelation, that longer-chain curable RTIL prepolymers form immobile ion-gels more rapidly than shorter-chain variants, and that even the smaller curable prepolymers gel more quickly than a comparable monomer solution.

Example 10: Ideal (i.e., Single) Gas Permeability Time-Lag Measurements

The construction and operation of the time-lag gas permeation apparatus is described in detail than by Bara, et al., 2007, Industrial & Engineering Chemistry Research 46:5398-5404). Membranes made using the technique detailed in elsewhere herein were 'masked' by cutting out defect free regions with a razor, placing the section on a circular piece of aluminum backed tape with ¼ inch or ½ inch diameter hole punched into it, and then covering the piece of membrane with a second circular piece of tape with a hole punched into it. These masks were loaded into a cell with an internal diameter of 40 mm. The cells were screwed shut and vacuum was applied to both the feed and permeate sides to degas the membrane for 12 h and remove any residual solvent or gas adsorbed from the environment. Degassing was done before all gas permeation test runs. One (1) atm of the test gas was introduced into the evacuated feed volume, and the permeate side of the apparatus was kept under vacuum. A valve was opened to connect the feed volume to the feed side of the membrane chamber and data recording began for feed and permeate side pressure. Details of the calculations used to convert the pressure vs. time data into permeated volume vs. time data, and ultimately into permeability, solubility, and diffusivity values are also presented by Li, et al., 2006, Advanced Materials 18:2601-2603.

Permeability was calculated from the linear section of a permeated volume vs. time graph, where the slope provides flux and the intercept is related to 0, the time lag. Permeability is the product of gas diffusivity and solubility, which themselves can be expressed by the following equation:

$$\frac{V_{perm} \Delta P}{A_e t R T \phi} * \frac{l}{\Delta p_i} = D_i S_i = P_i$$

where l is the membrane thickness in cm, $A_e$ is the membrane area exposed by the mask in cm$^2$, t is the elapsed time in minutes, $\Delta p$ is average pressure drop in cm Hg, T is temperature in K, $\phi$ is the porosity fraction of a support (set to 1 for a bulk film), and $V_{perm}$ is the permeated volume given in L. Diffusivity can be calculated based on the time lag from the following equation:

$$D_i = \frac{l^2}{6\theta}$$

Once diffusivity and permeability are known, solubility can be obtained trivially, assuming that the solution-diffusion mechanism is valid. Ideal gas pair selectivity is calculated by taking the ratio of the permeability of the fast gas to the slow gas.

Ideal (i.e., single-gas) permeabilities for CO$_2$ and CH$_4$ were determined for a series of MMM samples with different component loadings (given as weight percent of curable RTIL prepolymer-RTIL-zeolite) and different RTIL prepolymer number-average degree of polymerization (x) values. These data are summarized in Table 4. MMMs made with curable RTIL prepolymer 1a (x=14) performed poorly in terms of both CO$_2$/CH$_4$ gas selectivity and CO$_2$ permeability. Membranes made using the slightly longer curable RTIL prepolymer 1b (x=17) demonstrated an improvement in performance compared to the parent zeolite-free [poly (RTIL)]-RTIL ion gels (i.e., 80/20/0 (w/w/w) loading), but they exhibit little improvement when 20 wt % SAPO-34 is added to them. Furthermore, the zeolite-free membranes based on curable RTIL prepolymers 1c (x=57) and 1d (x=87) show virtually identical CO$_2$/CH$_4$ gas transport performances compared to the zeolite-free MMM based on prepolymer 1b (x=17). This suggests that by the time the curable RTIL prepolymers are approximately 20 repeat units long, they already display most of the gas transport properties of longer polymer chains. Adding 20 wt % SAPO-34 particles into the composition based on prepolymer 1c (x=57) almost doubles the permeability of CO$_2$, leaving the selectivity unchanged. The MMM based on RTIL prepolymer 1d (x=87) exhibits further improvements in permeability and selectivity and is comparable in gas separation performance to a previously reported MMM based on an RTIL monomer that had the same zeolite, RTIL, and component, loadings. While increasing the chain length of the curable RTIL prepolymers does not improve the performance of membranes without zeolite, it does substantially improve the performance of zeolite-containing MMMs.

Analyzing the gas separation performances of the MMMs based on curable RTIL prepolymers of different lengths revealed a link between prepolymer MW and improved MMM performance. A MMM made with an 87-mer of these materials performs competitively with similar MMMs based on cross-linked poly([1-styryl-3-methylimidazolium] [Tf$_2$N]), the [poly(RTIL)] used for some of the known best-performing (cross-linked [poly(RTIL)]-RTIL-zeolite) MMMs. Additionally, longer curable RTIL prepolymers were observed to gel/solidify more quickly than shorter ones (all else held constant), and even short oligomers of these curable RTIL prepolymers better resist support penetration when compared to analogous solutions of RTIL monomers.

TABLE 4

Comparison of Gas Transport Properties for MMMs with Different Curable RTIL prepolymer Chain lengths and Component Loadings [a]

| Curable RTIL Prepolymer Used | MMM Composition[b] | $CO_2$ Permeability (barrers) | $CH_4$ Permeability (barrers)[c] | $CO_2/CH_4$ Selectivity |
|---|---|---|---|---|
| 1a | 80/20/0 | 9.3 ± 0.2 | 0.38 ± 0.01 | 25.5 ± 0.1 |
| 1a | 64/16/20 | 4 ± 1 | 0.12 ± 0.02 | 30 ± 10 |
| 1a | 50/20/30 | 14.55 ± 0.05 | 2.57 ± 0.05 | 5.67 ± 0.03 |
| 1a | 40/30/30 | 26.6 ± 0.2 | 3.23 ± 0.02 | 8.20 ± 0.07 |
| 1b | 80/20/0 | 24 ± 1 | 0.99 ± 0.07 | 24 ± 2 |
| 1b | 64/16/20 | 24 ± 1 | 0.85 ± 0.21 | 30 ± 8 |
| 1c | 80/20/0 | 23.1 ± 0.1 | 0.71 ± 0.06 | 32 ± 3 |
| 1c | 64/16/20 | 43.3 ± 0.1 | 1.5 ± 0.4 | 30 ± 7 |
| 1d | 80/20/0 22. | 89 ± 0.02 | 0.89 ± 0.05 | 26 ± 2 |
| 1d | 64/16/20 | 47 ± 1 | 1.1 ± 0.1 | 42 ± 5 |

[a] All measurements were taken with 1 atm with a feed gas pressure at 21° C. Reported values are the average of triplicate tests.
[b] Composition reported as wt % values given as (curable RTIL prepolymer-[EMIM][Tf$_2$N]-SAPO-34).
[c] For membranes with very low $CH_4$ permeability, it is difficult to distinguish the $CH_4$ permeation from the small intrinsic leak rate of the gas permeation test system. Greater uncertainty in selectivity is tied to the uncertainty of detecting methane.

Example 11: SEM Imaging of MMMs

Dual-beam focused ion beam (FIB) SEM instruments combine an ion beam with an electron microscope. This allows for controlled milling into a sample surface to reveal a smooth cross-section several microns deep. In the following images, a 6.5 nA cutting beam was used to create a cleaning cross-section 10 μm wide by 10 μm long, to a depth of 8 μm. The perspective of the electron beam images is at an angle of 52 degrees from perpendicular, so that images of the cross-section may be obtained. In all of the MMM samples imaged, zeolite particles are visible dispersed in the cross-linked [poly(RTIL)]-RTIL matrix. There are no visible void defects either in the bulk of the [poly(RTIL)]-RTIL matrix or near the zeolite interfaces common to MMMs without an RTIL interfacial agent present. This is consistent with the relatively low reported permeabilities.

ENUMERATED EMBODIMENTS

The following exemplary embodiments are provided, the numbering of which is not to be construed as designating levels of importance.

Embodiment 1 provides a composition comprising
a) at least one porous solid;
b) a non-polymerizable room-temperature ionic liquid [RTIL];
c) a polymer [poly(RTIL)] comprising a backbone and a plurality of side chains attached to the backbone, wherein the plurality of side chains comprises independently selected RTILs, wherein at least one RTIL in the plurality of side chains is functionalized with a self-cross-linking group;

wherein each RTIL is independently a compound of Formula (I):

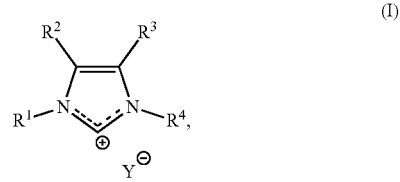

wherein:
each occurrence of $R^1$ and $R^4$ is independently selected from the group consisting of optionally substituted $C_1$-$C_6$ alkyl, optionally substituted $C_2$-$C_6$ alkenyl, optionally $C_2$-$C_6$ alkynyl, optionally $C_1$-$C_6$ alkoxy, optionally $C_1$-$C_6$ aminoalkyl, optionally $C_1$-$C_6$ haloalkoxy, optionally $C_1$-$C_6$ haloalkyl, optionally substituted aryl, and optionally substituted heteroaryl;
each occurrence of $R^2$ and $R^3$ is independently selected from the group consisting of H, optionally substituted $C_1$-$C_6$ alkyl, optionally substituted $C_2$-$C_6$ alkenyl, optionally $C_2$-$C_6$ alkynyl, optionally $C_1$-$C_6$ alkoxy, optionally $C_1$-$C_6$ aminoalkyl, optionally $C_1$-$C_6$ haloalkoxy, and optionally $C_1$-$C_6$ haloalkyl,
Y is an anion selected from the group consisting of $Tf_2N^-$, $BF_4^-$, $N(CN)_2^-$, $PF_6^-$, $C(CN)_3^-$, $B(CN)_4^-$, $N(SO_2F)_2^-$, $TfO^-$, $SbF_6^-$, halide, and sulfonate.

Embodiment 2 provides the composition of Embodiment 1, wherein the at least one porous solid comprises a nanoporous solid, zeolite, or molecular sieve Embodiment 3(a) provides the composition of any of Embodiments 1-2, wherein the zeolite comprises a silicoaluminophosphate, an aluminosilicate, a silicate, or an alkali metal aluminosilicate Embodiment 3(b) provides the composition of any of Embodiments 1-2, wherein the zeolite comprises SAPO-34 SSZ-13, DDR, or 13X.

Embodiment 4 provides the composition of any of Embodiments 1-3, wherein the self-cross-linking group is selected from the group consisting of terminal alkene, acrylate, methacrylate, or diene.

Embodiment 5 provides the composition of any of Embodiments 1-4, wherein the terminal alkene comprises vinyl, halovinyl, vinyl ether, or styrene.

Embodiment 6 provides the composition of any of Embodiments 1-5, wherein the non-polymerizable RTIL of Formula (I) is a compound of Formula (Ia):

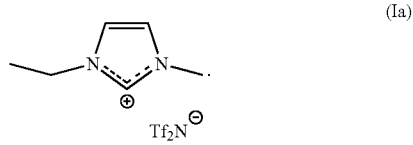

Embodiment 7 provides the composition of any of Embodiments 1-6, wherein the backbone of the [poly (RTIL)] is derived from reversible addition fragmentation chain transfer (RAFT) polymerization.

Embodiment 8 provides the composition of any of Embodiments 1-7, wherein the [poly(RTIL)] is the polymer having Formula (II):

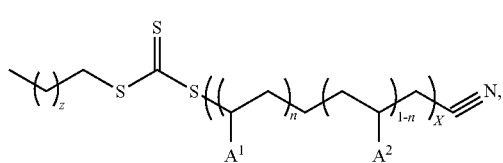

(II)

wherein
- $A^1$ comprises a RTIL comprising a self-cross-linking group;
- $A^2$ comprises a RTIL not comprising a self-cross-linking group;
- z is an integer ranging from 2 to 25;
- x is an integer ranging from 10 to 90; and
- n is greater than 0 and less 1.

Embodiment 9 provides the composition of any of Embodiments 1-8, wherein $A^1$ comprises the side chain having Formula (IV) and $A^2$ comprises the side chain having Formula (V):

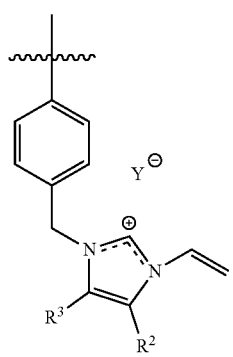

(IV)

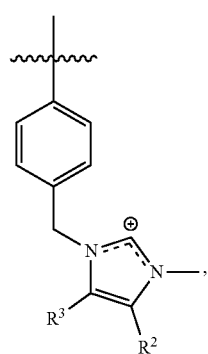

(V)

wherein:
each occurrence of $R^2$ and $R^3$ is independently selected from the group consisting of H, optionally substituted $C_1$-$C_6$ alkyl, optionally substituted $C_2$-$C_6$ alkenyl, optionally $C_2$-$C_6$ alkynyl, optionally $C_1$-$C_6$ alkoxy, optionally $C_1$-$C_6$ aminoalkyl, optionally $C_1$-$C_6$ haloalkoxy, and optionally $C_1$-$C_6$ haloalkyl; and
Y is an anion selected from the group consisting of $Tf_2N^-$, $BF_4^-$, $N(CN)_2^-$, $PF_6^-$, $C(CN)_3^-$, $B(CN)_4^-$, $N(SO_2F)_2^-$, $TfO^-$, $SbF_6^-$, halide, and sulfonate.

Embodiment 10 provides the composition of any of Embodiments 1-9, wherein the side chain comprising Formula (IV) is the side chain of Formula (IVa) and the side chain comprising Formula (V) is the side chain of Formula (Va):

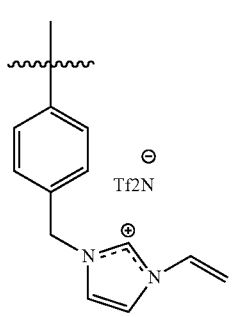

(IVa)

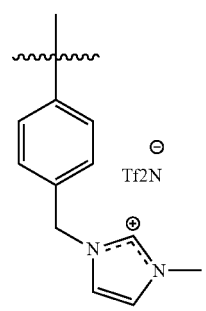

(Va)

Embodiment 11 provides the composition of any of Embodiments 1-10, wherein in the [poly(RTIL)] RTILs with a self-cross-linking group side chain comprise about 20 mol % to about 35 mol % of the total RTILs in the poly[RTIL].

Embodiment 12 provides the composition of any of Embodiments 1-11, wherein the [poly(RTIL)] comprises about 50% to about 85% of the weight of the composition.

Embodiment 13 provides the composition of any of Embodiments 1-12, wherein the RTIL comprises about 10% to about 35% of the weight of the composition.

Embodiment 14 provides the composition of any of Embodiments 1-13, wherein the porous solids comprise about 1% to about 35% of the weight of the composition.

Embodiment 15 provides the composition of any of Embodiments 1-14, which is at least partially polymerized.

Embodiment 16 provides the composition of Embodiment 15, wherein the at least partial polymerization does not require use of any additional cross-linking agent.

Embodiment 17 provides the composition of any of Embodiments 1-16, wherein the composition is cast on a porous support to form a mixed matrix membrane (MMM).

Embodiment 18 provides a mixed-matrix membrane (MMM) formed from the composition of any of Embodiments 1-17.

Embodiment 19 provides the MMM of Embodiment 18, which has higher permeability for $CO_2$ than for $CH_4$.

Embodiment 20 provides the MMM of any of Embodiments 17-19, wherein the membrane has $CO_2$ permeability of about 9 barriers to about 48 barriers.

Embodiment 21 provides the MMM of any of Embodiments 17-20, wherein the membrane has a carbon dioxide/methane ($CO_2$/$CH_4$) separation selectivity of about 25:1 to about 47:1.

Embodiment 22 provides the MMM of any of Embodiments 17-21, wherein the MMM is cast on a porous support membrane.

Embodiment 23 provides a method of selectively separating a first gas component from a gas mixture containing at least a first component and a second gas component, the method comprising contacting the gas mixture with a surface of the MMM of any of Embodiments 17-22, wherein the first gas component selectively diffuses to the opposite surface of the MMM as compared to second gas component, thus selectively removing the first gas component over the second gas component from the gas mixture.

Embodiment 24 provides the method of Embodiment 23, wherein the first gas component is carbon dioxide ($CO_2$) and the second gas component is methane ($CH_4$).

Embodiment 25 provides a kit comprising the composition of any of Embodiments 1-17 and/or the MMM of any of Embodiments 18-22 and an instructional material, wherein the instructional material comprises instructions for separating a first gas component from a gas mixture containing at least a first component and a second gas component.

The recitation of a listing of elements in any definition of a variable herein includes definitions of that variable as any single element or combination (or subcombination) of listed elements. The recitation of an embodiment herein includes that embodiment as any single embodiment or in combination with any other embodiments or portions thereof.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A composition comprising:
   at least one porous solid;
   a non-polymerizable room-temperature ionic liquid [RTIL];
   a [poly(RTIL)] polymer of Formula (II):

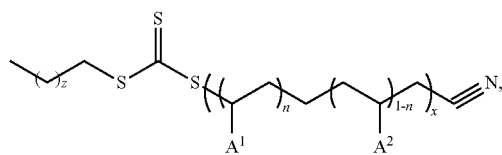
(II)

wherein:
   $A^1$ is an RTIL comprising a self-cross-linking group;
   $A^2$ is an RTIL not comprising a self-cross-linking group;
   z is an integer ranging from 2 to 25;
   x is an integer ranging from 10 to 90; and
   n is greater than 0 and less than 1;
   wherein each non-polymerizable RTIL is independently a compound of Formula (I):

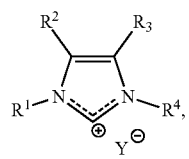
(I)

wherein:
   each occurrence of $R^1$ and $R^4$ is independently selected from the group consisting of optionally substituted $C_1$-$C_6$ alkyl, optionally substituted $C_2$-$C_6$ alkenyl, optionally $C_2$-$C_6$ alkynyl, optionally $C_1$-$C_6$ alkoxy, optionally $C_1$-$C_6$ aminoalkyl, optionally $C_1$-$C_6$ haloalkoxy, optionally $C_1$-$C_6$ haloalkyl, optionally substituted aryl, and optionally substituted heteroaryl;
   each occurrence of $R^2$ and $R^3$ is independently selected from the group consisting of H, optionally substituted $C_1$-$C_6$ alkyl, optionally substituted $C_2$-$C_6$ alkenyl, optionally $C_2$-$C_6$ alkynyl, optionally $C_1$-$C_6$ alkoxy, optionally $C_1$-$C_6$ aminoalkyl, optionally $C_1$-$C_6$ haloalkoxy, and optionally $C_1$-$C_6$ haloalkyl; and
   Y is an anion selected from the group consisting of $Tf_2N^-$, $BF_4^-$, $N(CN)_2^-$, $PF_6^-$, $C(CN)_3^-$, $B(CN)_4^-$, $N(SO_2F)_2^-$, $TfO^-$, $SbF_6^-$, halide, and sulfonate.

2. The composition of claim 1, wherein the at least one porous solid comprises a nanoporous solid, zeolite, or molecular sieve.

3. The composition of claim 2, wherein the zeolite comprises a silicoaluminophosphate, an aluminosilicate, a silicate, or an alkali metal aluminosilicate.

4. The composition of claim 1, wherein the self-cross-linking group is selected from the group consisting of terminal alkene, acrylate, methacrylate, or diene.

5. The composition of claim 1, wherein the terminal alkene comprises vinyl, halovinyl, vinyl ether, or styrene.

6. The composition of claim 1, wherein the non-polymerizable RTIL of Formula (I) is a compound of Formula (Ia):

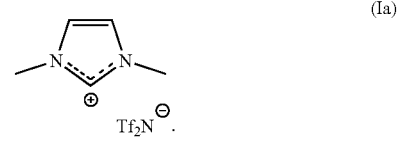
(Ia)

7. The composition of claim 1, wherein the backbone of the [poly(RTIL)] is derived from reversible addition fragmentation chain transfer (RAFT) polymerization.

8. The composition of claim 1, wherein $A^1$ has the structure of Formula (IV):

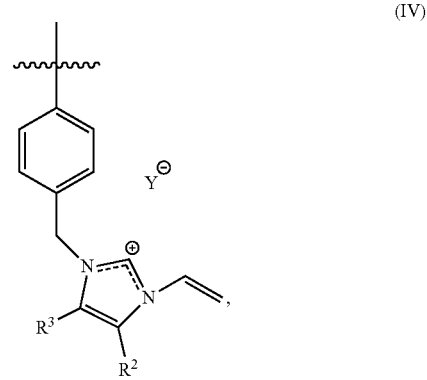
(IV)

and A² has the structure of Formula (V):

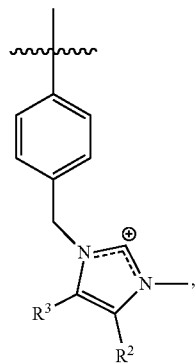
(V)

wherein:
each occurrence of R² and R³ is independently selected from the group consisting of H, optionally substituted $C_1$-$C_6$ alkyl, optionally substituted $C_2$-$C_6$ alkenyl, optionally $C_2$-$C_6$ alkynyl, optionally $C_1$-$C_6$ alkoxy, optionally $C_1$-$C_6$ aminoalkyl, optionally $C_1$-$C_6$ haloalkoxy, and optionally $C_1$-$C_6$ haloalkyl; and Y is an anion selected from the group consisting of $Tf_2N^-$, $BF_4^-$, $N(CN)_2^-$, $PF_6^-$, $C(CN)_3^-$, $B(CN)_4^-$, $N(SO_2F)_2^-$, $TfO^-$, $SbF_6^-$, halide, and sulfonate.

9. The composition of claim 8, wherein A¹ has the structure of Formula (IVa):

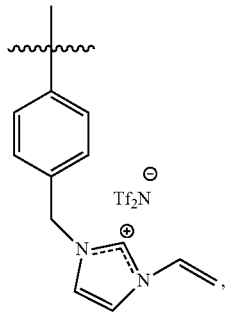
(IVa)

and A² has the structure of Formula (Va):

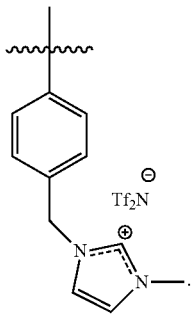
(Va)

10. The composition of claim 1, wherein RTILs comprising a self-cross-linking group side chain are about 20 mol % to about 35 mol % of the total RTILs in the poly[RTIL].

11. The composition of claim 1, wherein the [poly(RTIL)] is about 50% to about 85% of the weight of the composition.

12. The composition of claim 1, wherein the non-polymerizable RTIL is about 10% to about 35% of the weight of the composition.

13. The composition of claim 1, wherein the porous solids are about 1% to about 35% of the weight of the composition.

14. The composition of claim 1, which is at least partially polymerized.

15. The composition of claim 14, wherein the at least partial polymerization does not require use of any additional cross-linking agent.

16. The composition of claim 1, wherein the composition is cast on a porous support to form a mixed matrix membrane (MMM).

17. A MMM formed from the composition of claim 1.

18. The MMM of claim 17, which has higher permeability for $CO_2$ than for $CH_4$.

19. The MMM of claim 18, wherein the MMM has $CO_2$ permeability of about 9 barrers to about 48 barrers.

20. The MMM of claim 17, wherein the MMM has a carbon dioxide/methane ($CO_2/CH_4$) gas separation selectivity of about 25:1 to about 47:1.

21. The MMM of claim 17, where in the MMM is cast on a porous support membrane.

22. A method of selectively separating a first gas component from a gas mixture containing at least a first component and a second gas component,
the method comprising contacting the gas mixture with a surface of the MMM of claim 16, wherein the first gas component selectively diffuses to the opposite surface of the MMM as compared to second gas component, thus selectively removing the first gas component over the second gas component from the gas mixture.

23. The method of claim 22, wherein the first gas component is carbon dioxide ($CO_2$) and the second gas component is methane ($CH_4$).

24. A kit comprising the composition of claim 1 or the MMM formed therefrom, and an instructional material, wherein the instructional material comprises instructions for separating a first gas component from a gas mixture containing at least a first component and a second gas component.

* * * * *